United States Patent
Cai et al.

(10) Patent No.: US 11,191,036 B2
(45) Date of Patent: Nov. 30, 2021

(54) POWER CONTROL BASED ON PATH LOSS AND POWER VALUE

(71) Applicant: Huawei Technologies Co., Ltd., Shenzhen (CN)

(72) Inventors: Yu Cai, Beijing (CN); Yongbo Zeng, Beijing (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/638,312

(22) PCT Filed: Nov. 2, 2017

(86) PCT No.: PCT/CN2017/109156
§ 371 (c)(1),
(2) Date: Feb. 11, 2020

(87) PCT Pub. No.: WO2019/029028
PCT Pub. Date: Feb. 14, 2019

(65) Prior Publication Data
US 2020/0229105 A1    Jul. 16, 2020

(30) Foreign Application Priority Data

Aug. 11, 2017 (WO) ................ PCT/CN2017/097229

(51) Int. Cl.
*H04W 76/14* (2018.01)
*H04W 52/24* (2009.01)

(52) U.S. Cl.
CPC ....... *H04W 52/241* (2013.01); *H04W 52/242* (2013.01); *H04W 52/243* (2013.01); *H04W 52/245* (2013.01); *H04W 76/14* (2018.02)

(58) Field of Classification Search
CPC . H04W 52/383; H04W 52/242; H04W 76/14; H04W 52/243; H04W 52/18; H04W 52/325; H04W 52/367; H04W 72/0473; H04W 4/70; H04W 52/00; H04W 52/143;
(Continued)

(56) References Cited

U.S. PATENT DOCUMENTS

| 2012/0243431 A1 | 9/2012 | Chen et al. |
| 2014/0010099 A1 | 1/2014 | Chiu et al. |
| 2014/0198694 A1 | 7/2014 | Yang et al. |

(Continued)

FOREIGN PATENT DOCUMENTS

| CN | 103139889 A | 6/2013 |
| CN | 103546970 A | 1/2014 |

(Continued)

OTHER PUBLICATIONS

Intel Corporation, "Evaluation of Sidelink Communication Enhancements for IoT-centric Scenario," 3GPP TSG RAN WG1 Meeting #89, Hangzhou, P.R. China, May 15-19, 2017, 6 pages.

*Primary Examiner* — Philip Sobutka
(74) *Attorney, Agent, or Firm* — Conley Rose, P.C.

(57) ABSTRACT

A power control method, a terminal, and a network device include, when any one of two terminals that perform direct communication determines a transmission power of the terminal, the terminal determines the transmission power based on at least one of a path loss between the two terminals, and a channel quality status of another terminal used as a receive end.

16 Claims, 14 Drawing Sheets

(58) Field of Classification Search
CPC ............. H04W 52/146; H04W 52/241; H04W 52/245
USPC ........................................................ 455/522
See application file for complete search history.

(56) References Cited

U.S. PATENT DOCUMENTS

| | | |
|---|---|---|
| 2014/0274196 A1 | 9/2014 | Dai et al. |
| 2016/0262111 A1 | 9/2016 | Boudreau et al. |
| 2016/0330699 A1 | 11/2016 | Yang et al. |
| 2017/0188391 A1 | 6/2017 | Rajagopal et al. |
| 2017/0367056 A1* | 12/2017 | Wei ....................... H04W 24/10 |
| 2018/0249429 A1 | 8/2018 | Zhang et al. |
| 2020/0107280 A1 | 4/2020 | Wei |

FOREIGN PATENT DOCUMENTS

| | | |
|---|---|---|
| CN | 104602350 A | 5/2015 |
| CN | 104904279 A | 9/2015 |
| CN | 105323841 A | 2/2016 |
| CN | 105722200 A | 6/2016 |
| CN | 105934978 A | 9/2016 |
| WO | 2011069295 A1 | 6/2011 |
| WO | 2016086814 A1 | 6/2016 |
| WO | 2017070957 A1 | 5/2017 |

* cited by examiner

POWER CONTROL BASED ON PATH LOSS AND POWER VALUE

CROSS-REFERENCE TO RELATED APPLICATIONS

This application is a U.S. National Stage of International Patent Application No. PCT/CN2017/109156 filed on Nov. 2, 2017, which claims priority to International Patent Application No. PCT/CN2017/097229 filed on Aug. 11, 2017. Both of the aforementioned applications are hereby incorporated by reference in their entireties.

TECHNICAL FIELD

This application relates to the field of communications technologies, and in particular, to a power control method, a terminal, and a network device.

BACKGROUND

In the 3rd generation partnership project (3rd generation partnership project, 3GPP), device-to-device (device-to-device, D2D) communication is also referred to as proximity service (proximity service, ProSe), and is a new technology that allows, under control of a system, direct communication between terminals by reusing cell resources. The D2D communication can improve spectral efficiency of a communications system, reduce a transmission power used when a terminal performs signal transmission, and resolve a problem of shortage of spectrum resources in a wireless communications system to some extent.

In a 3GPP protocol, a terminal uses a sidelink (sidelink) to implement ProSe functions. When the terminal performs D2D communication through the sidelink, a transmission power needs to be controlled, to avoid interference to another terminal. Usually, the terminal determines a transmission power of the terminal based on a path loss between the terminal and a network device. However, when two terminals that perform D2D communication are relatively close to each other, and when a path loss between any one of the two terminals and a network device is used to determine a transmission power of the terminal, the terminal may use a power greater than a required transmit power for transmission, thereby causing unnecessary waste of power consumption.

SUMMARY

Embodiments of this application provide a power control method, a terminal, and a network device, so as to determine a more accurate transmission power for a terminal that performs D2D communication, thereby reducing power consumption of the terminal.

According to a first aspect, a power control method is provided. In the method, when any one of two terminals that perform direct communication determines a transmission power of the terminal, the terminal determines the transmission power based on at least one of a path loss between the two terminals that perform direct communication and a channel quality status of another terminal used as a receive end in the two terminals that perform direct communication, so that a more accurate power can be determined, and therefore signal transmission can be performed based on the determined transmission power, to avoid, to some extent, using a power higher than an actually required transmission power to perform signal transmission.

In a possible design, a second terminal or a network device determines first power indication information that is used by a first terminal to determine a transmission power, and sends the first power indication information to the first terminal; and the first terminal receives the first power indication information sent by the second terminal or the network device, determines the transmission power of the first terminal based on the received first power indication information, and transmits a signal to the second terminal based on the determined transmission power. The first power indication information is determined by the second terminal or the network device based on a path loss between the second terminal and the first terminal, thereby avoiding, to some extent, that the first terminal uses a power higher than an actually required transmission power to perform signal transmission.

The first terminal is a terminal that determines a transmission power, and the second terminal is a terminal that performs direct communication with the first terminal.

That the first power indication information is determined by the second terminal or the network device based on the path loss between the second terminal and the first terminal specifically means that the first power indication information is determined by the second terminal or the network device based on a first power value and the path loss between the second terminal and the first terminal.

Specifically, the first power value is determined by the second terminal based on quality information, obtained by the second terminal through measurement, of a channel for communication between the second terminal and the first terminal; or the first power value is determined by the second terminal based on second power indication information sent by the network device to the second terminal. The second power indication information is used to indicate the first power value.

The path loss between the second terminal and the first terminal may be determined by the second terminal. An implementation process in which the second terminal determines the path loss between the second terminal and the first terminal may be performed in the following manner: Before the first terminal receives the first power indication information sent by the second terminal or the network device, the first terminal sends a first signal to the second terminal, and the second terminal receives the first signal, and determines the path loss between the second terminal and the first terminal based on a transmit power of the first signal.

The transmit power of the first signal may be a preset fixed power value, or may be indicated by using first-signal transmit power indication information sent by the first terminal to the second terminal, or may be configured by the second terminal or the network device, or may be preconfigured.

That the second terminal determines the path loss between the second terminal and the first terminal based on the transmit power of the first signal may be implemented in one of the following manners: The second terminal may measure a first-signal receive power at which the second terminal receives the first signal, and determine the path loss between the second terminal and the first terminal based on the first-signal receive power and a first-signal transmit power. Specifically, the path loss between the second terminal and the first terminal may be understood as a difference between the first-signal transmit power and the first-signal receive power. The first terminal may also send the first signal to the second terminal for a plurality of times, and the second terminal may perform filtering on a plurality of first-signal receive powers at which the first signal is received for a plurality of times, and determine the path loss between the second terminal and the first terminal based on a filtered receive power.

In another possible design, the first terminal receives third power indication information sent by the second terminal or the network device, and determines a transmission power of the first terminal based on the third power indication information and a path loss between the first terminal and the second terminal, and the first terminal transmits a signal to the second terminal based on the transmission power.

The path loss between the first terminal and the second terminal may be determined by the first terminal based on received path loss indication information, and the path loss indication information is sent by the network device or the second terminal, and is used to indicate the path loss between the second terminal and the first terminal. The path loss indication information may be determined by the second terminal and sent to the first terminal, or may be determined by the second terminal and sent to the network device, and further sent by the network device to the first terminal.

Alternatively, the path loss between the first terminal and the second terminal may be determined in the following manner: The first terminal sends a first signal to the second terminal, and receives first-signal receive power indication information sent by the second terminal, where the first-signal receive power indication information is used to indicate a receive power at which the second terminal receives the first signal; and the first terminal determines the path loss between the first terminal and the second terminal based on the first-signal receive power indication information.

Alternatively, the path loss between the second terminal and the first terminal may be determined in the following manner: The second terminal sends a second signal to the first terminal, and the first terminal receives the second signal sent by the second terminal, and determines the path loss between the first terminal and the second terminal based on a transmit power of the second signal.

Specifically, the first terminal may determine the path loss between the first terminal and the second terminal based on a receive power at which the first terminal receives the second signal and the transmit power at which the second terminal sends the second signal. The path loss between the first terminal and the second terminal may be a difference between the transmit power at which the second terminal sends the second signal and the receive power at which the first terminal receives the second signal. The transmit power at which the second terminal sends the second signal may be a fixed value, or may be configured by a network device, or may be predefined. In this case, the first terminal may use a predefined manner to determine the transmit power at which the second terminal sends the second signal. The transmit power at which the second terminal sends the second signal may be indicated by using second-signal transmit power indication information sent by the second terminal to the first terminal, where the second-signal transmit power indication information is used to indicate the transmit power at which the second terminal sends the second power. In this case, the first terminal may determine the transmit power at which the second terminal sends the second signal based on the second-signal transmit power indication information.

The third power indication information may be determined by the second terminal based on quality information, obtained by the second terminal through measurement, of a channel for communication between the second terminal and the first terminal; or the third power indication information may be determined by the second terminal based on the second power indication information sent by the network device to the second terminal.

The quality information of the channel includes at least one of the following: a receive interference level, signal received quality, and received signal strength.

In another possible design, the second terminal may send channel information to the network device, and the channel information is used to indicate quality information of a channel for communication between the first terminal and the second terminal. The network device receives the channel information sent by the second terminal, and determines second power indication information based on the quality information of the channel.

The network device sends the second power indication information to the second terminal. The second terminal receives the second power indication information that is determined by the network device based on the quality information of the channel and that is sent by the network device. The second terminal determines first power indication information based on the second power indication information, and sends the first power indication information to the first terminal. Alternatively, the second terminal determines third power indication information based on the second power indication information, and sends the third power indication information to the first terminal.

The first power indication information is used by the first terminal to determine a transmission power of the first terminal. The first terminal determines that the transmission power of the first terminal is a transmission power used when the first terminal communicates with the second terminal.

Specifically, the second terminal may determine the first power indication information based on the second power indication information and a path loss between the second terminal and the first terminal.

The second power indication information is used by the second terminal to determine the first power indication information based on the second power indication information, or the second power indication information is used by the second terminal to determine third power indication information based on the second power indication information.

The third power indication information is used by the first terminal to determine a transmission power of the first terminal. The transmission power that is of the first terminal and that is determined by the first terminal is a transmission power used when the first terminal communicates with the second terminal.

Specifically, the second terminal may determine the third power indication information based on the second power indication information and the path loss between the second terminal and the first terminal.

The third power indication information may be determined by the second terminal based on quality information, obtained by the second terminal through measurement, of a channel for communication between the second terminal and the first terminal, or the third power indication information is determined by the second terminal based on the second power indication information sent by the network device to the second terminal.

The second power indication information is used to indicate a first power value.

In another possible design, the second terminal may send channel information to the network device, and the channel information is used to indicate quality information of a channel for communication between the first terminal and the second terminal. The network device receives the channel information sent by the second terminal, and determines second power indication information based on the quality information of the channel. The network device determines third power indication information based on the quality information of the channel, and sends the third power indication information to the first terminal, where the third power indication information is used by the first terminal to determine a transmission power of the first terminal.

In another possible design, the second terminal may send channel information to the network device, and the channel information is used to indicate quality information of a channel for communication between the first terminal and the second terminal. The network device receives the channel information sent by the second terminal, and determines second power indication information based on the quality information of the channel. The network device determines first power indication information based on the quality information of the channel, and sends the first power indication information to the first terminal, where the first power indication information is used by the first terminal to determine a transmission power of the first terminal.

According to a second aspect, a power control apparatus is provided. The power control apparatus is applied to a first terminal. The power control apparatus applied to the first terminal includes units or means (means) for performing steps performed by the first terminal in the first aspect. The units or means may be implemented by using hardware, or may be implemented by executing corresponding software by hardware. The hardware or software includes one or more modules corresponding to the foregoing function. The module may be software and/or hardware.

In a possible design, the power control apparatus applied to the first terminal includes a receiving unit, a processing unit, and a sending unit, where functions of the receiving unit, the processing unit, and the sending unit may correspond to the method steps. Details are not described herein again.

According to a third aspect, a power control apparatus is provided. The power control apparatus is applied to a second terminal. The power control apparatus applied to the second terminal includes units or means (means) for performing steps performed by the second terminal in the first aspect. The units or means may be implemented by using hardware, or may be implemented by executing corresponding software by hardware. The hardware or software includes one or more modules corresponding to the foregoing function. The module may be software and/or hardware.

In a possible design, the power control apparatus applied to the second terminal includes a sending unit, a receiving unit, and a processing unit, where functions of the sending unit, the receiving unit, and the processing unit may correspond to the method steps. Details are not described herein again.

According to a fourth aspect, a power control apparatus is provided. The power control apparatus is applied to a network device. The power control apparatus applied to the network device includes units or means (means) for performing steps performed by the network device in the first aspect. The units or means may be implemented by using hardware, or may be implemented by executing corresponding software by hardware. The hardware or software includes one or more modules corresponding to the foregoing function. The module may be software and/or hardware.

In a possible design, the power control apparatus applied to the network device includes a receiving unit, a processing unit, and a sending unit, where functions of the receiving unit, the processing unit, and the sending unit may correspond to the method steps. Details are not described herein again.

According to a fifth aspect, a first terminal is provided, includes a transmitter, a receiver, and a processor, and may further include a memory, where the memory is configured to couple with the processor, and stores a program instruction and data that are necessary for the first terminal, the processor invokes and executes the program instruction stored in the memory, sends data by using the transmitter, and receives data by using the receiver, to implement functions performed by the first terminal in the first aspect and any possible design of the first aspect.

In a possible design, the first terminal may further include an antenna.

According to a sixth aspect, a second terminal is provided, includes a transmitter, a receiver, and a processor, and may further include a memory, where the memory is configured to couple with the processor, and stores a program instruction and data that are necessary for the second terminal, the processor invokes and executes the program instruction stored in the memory, sends data by using the transmitter, and receives data by using the receiver, to implement functions performed by the second terminal in the first aspect and any possible design of the first aspect.

In a possible design, the second terminal may further include an antenna.

According to a seventh aspect, a network device is provided, and the network device includes a processor and a transceiver, and may further include a memory. The memory is configured to be couple with the processor, and stores a program instruction and data that are necessary for the network device. The processor, the transceiver, and the memory are connected with each other. The memory is configured to store an instruction. The processor invokes and executes the program instruction stored in the memory, and controls the transceiver to receive and send data, to complete functions performed by the network device in the first aspect and any possible design of the first aspect.

According to an eighth aspect, a communications system is provided, and includes the network device in the seventh aspect, one or more first terminals in the fifth aspect, and one or more second terminals in the sixth aspect.

According to a ninth aspect, a computer storage medium is provided. The computer-readable storage medium stores a computer instruction. When the instruction runs on a computer, any method related to the terminal or the network device in the first aspect or any possible design of the first aspect can be completed.

According to a tenth aspect, a computer program product is provided. The computer program product includes a computer program, and the computer program is used to perform and complete any method related to the terminal or the network device in the first aspect or any possible design of the first aspect.

According to an eleventh aspect, a chip is provided. The chip is connected to a memory, and is configured to read and execute a software program stored in the memory, to implement functions performed by the first terminal in the first aspect and any possible design of the first aspect.

According to a twelfth aspect, a chip is provided. The chip is connected to a memory, and is configured to read and execute a software program stored in the memory, to implement functions performed by the second terminal in the first aspect and any possible design of the first aspect.

According to a thirteenth aspect, a chip is provided. The chip is connected to a memory, and is configured to read and execute a software program stored in the memory, to implement functions performed by the network device in the first aspect and any possible design of the first aspect.

According to the power control method and apparatus, the terminal, and the network device provided in this application, when any one of two terminals that perform direct communication determines a transmission power of the terminal, the terminal determines the transmission power based on at least one of a path loss between the two terminals that perform direct communication and a channel quality status of another terminal used as a receive end in the two terminals that perform direct communication, so that a more accurate power can be determined, and therefore signal transmission can be performed based on the determined transmission power, to avoid, to some extent, using a power higher than an actually required transmission power to perform signal transmission.

DESCRIPTION OF EMBODIMENTS

Figure 1:
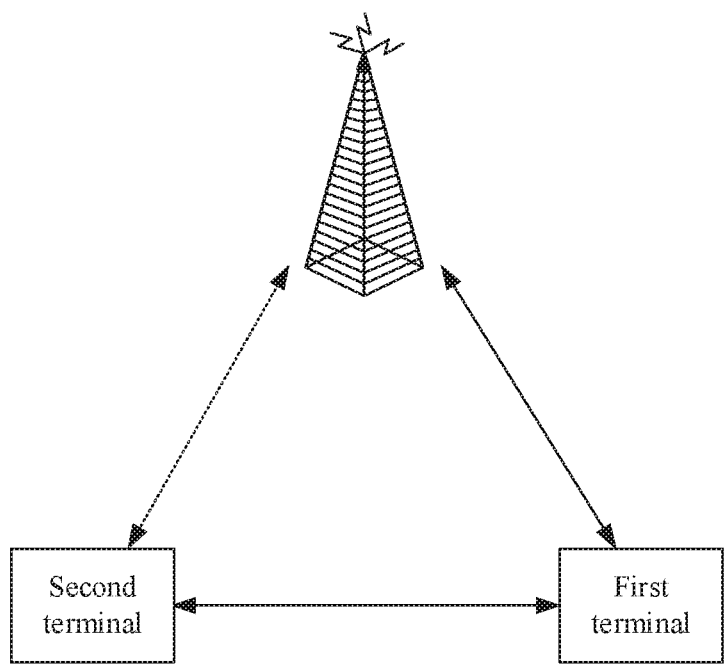
FIG. 1 is an architectural diagram of a system to which a power control method according to an embodiment of this application is applied.

The following describes embodiments of this application with reference to the accompanying drawings.

First, some terms in this application are described to help a person skilled in the art have a better understanding.

(1) Terminal, also referred to as user equipment (user equipment, UE), a mobile station (mobile station, MS), a mobile terminal (mobile terminal, MT), or the like, is a device for providing a user with voice and/or data connectivity, for example, a handheld device or a vehicle-mounted device having a wireless connection function. Currently, the terminal may be, for example, a mobile phone (mobile phone), a tablet computer, a notebook computer, a palmtop computer, a mobile Internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), or a wireless terminal in a smart home (smart home).

(2) Network device, which may be referred to as a radio access network (radio access network, RAN) device, is a device that connects a terminal to a wireless network, and may also be referred to as a base station. Currently, the RAN node may be, for example, a next generation NodeB (gNB), a transmission/reception point (transmission reception point, TRP), an evolved NodeB (evolved Node B, eNB), a radio network controller (radio network controller, RNC), a NodeB (Node B, NB), a base station controller (base station controller, BSC), a base transceiver station (Base Transceiver Station, BTS), a home base station (for example, home evolved NodeB or home Node B, HNB), a baseband unit (baseband unit, BBU), or a wireless fidelity (wireless fidelity, Wifi) access point (access point, AP). In addition, in a network structure, the RAN may include a centralized unit (centralized unit, CU) node and distributed unit (distributed unit, DU) nodes. This structure splits a protocol layer of an eNB in a long term evolution (long term evolution, LTE) system. Some functions of the protocol layer are assigned to the CU for centralized control, and the remaining functions or all functions of the protocol layer are distributed to the DUs, which are controlled by the CU in a centralized manner.

(3) The term "a plurality of" means two or more, and other quantifiers are similar thereto. The term "and/or" describes an association relationship between associated objects and indicates that three relationships may exist. For example, A and/or B may indicate the following three cases: Only A exists, both A and B exist, and only B exists. The character "/" generally indicates an "or" relationship between the associated objects.

(4) Interaction: Interaction means a process in which two interaction parties transfer information to each other. The information transferred herein may be the same or different. For example, the two interaction parties are a base station 1 and a base station 2, the base station 1 may request information from the base station 2, and the base station 2 provides the base station 1 with the information requested by the base station 1. Certainly, the base station 1 and the base station 2 may request information from each other. The information requested herein may be the same or different.

(5) The terms "network" and "system" are usually used interchangeably, and a person of skilled in the art may understand their meanings. The terms "information (information)", "signal (signal)", "message (message)", and "channel (channel)" may sometimes be used interchangeably. It should be noted that, when distinctions therebetween are not emphasized, meanings to be expressed are consistent. The terms "of (of)", "relevant (corresponding, relevant)" and "corresponding (corresponding)" may sometimes be used interchangeably. It should be noted that, with no emphasis on a difference between "of", "relevant", and "corresponding", meanings expressed are consistent.

A power control method provided in the embodiments of this application may be applied to a communication scenario in which two devices perform direct communication. A UE-to-network relay scenario is a typical application scenario in which two devices perform direct communication. In the UE-to-network relay scenario, a remote terminal (remote UE) may be connected to a network by using a relay terminal (relay UE). The relay terminal refers to a terminal that directly interacts with a network device. The remote terminal refers to a terminal that directly communicates with a network device by using a relay terminal. Usually, the remote terminal may be a low-capability device, for example, a wearable device, which has characteristics such as a small size, a small battery capacity, and a low radio frequency capability. Therefore, the remote device needs to reduce power consumed by the remote device, to prolong a standby time thereof. The relay terminal may be a high-capability device, for example, a high-capability smartphone. The relay terminal may serve as a relay node to assist a low-capability device in connecting to a network, to reduce power consumption of the low-capability device. The remote device is connected to a network through a relay device, so as to transmit a signal or establish a voice call service, to reduce power consumption of the remote device, and improve a transmission rate of the remote device.

FIG. 1 is a schematic architectural diagram of a UE-to-network relay scenario. In the application scenario shown in FIG. 1, a link between a network device and a first terminal and a link between the network device and a second terminal may be referred to as a cellular link, or may also be referred to as an uplink/downlink, and a link between the first terminal and the second terminal may be referred to as a sidelink (sidelink, SL). Signal transmission may be performed between the first terminal and the second terminal by using the sidelink. When signal transmission is performed by using the sidelink, the first terminal and the second terminal need to control a transmission power used for transmitting a signal, to reduce power consumption of the terminal, and reduce interference to another link.

Currently, a transmission power for signal transmission between two terminals that perform direct communication may be determined based on a path loss between any one of the two terminals and a network device. However, when the two terminals that perform direct communication are relatively close to each other, a path loss between the two terminals is relatively small, and these terminals may transmit a signal by using a relatively small transmission power. In addition, when a transmission power is currently determined, a channel quality status of a receive end is not considered. When the receive end has better channel quality, a transmit end may use a smaller transmission power. When a channel quality status of a receive end is not considered, a transmission power higher than a required transmission power may be used to perform signal transmission, thereby causing unnecessary waste of power consumption.

Therefore, according to an existing method for determining a transmission power, a terminal may use a transmission power higher than a required transmission power to perform signal transmission, thereby causing unnecessary waste of power consumption.

In view of this, an embodiment of this application provides a transmission power control method. In the method, when any one of two terminals that perform direct communication determines a transmission power of the terminal, the terminal determines the transmission power based on at least one of a path loss between the two terminals that perform direct communication and a channel quality status of another terminal used as a receive end in the two terminals that perform direct communication, so that a more accurate power can be determined, and therefore signal transmission can be performed based on the determined transmission power, to avoid, to some extent, using a power higher than an actually required transmission power to perform signal transmission.

For ease of description, in this embodiment of this application, that a first terminal is used as a terminal that needs to transmit a signal and determine a transmission power, and a second terminal is used as a target terminal that receives the signal transmitted by the first terminal is used as an example for description.

Figure 14:
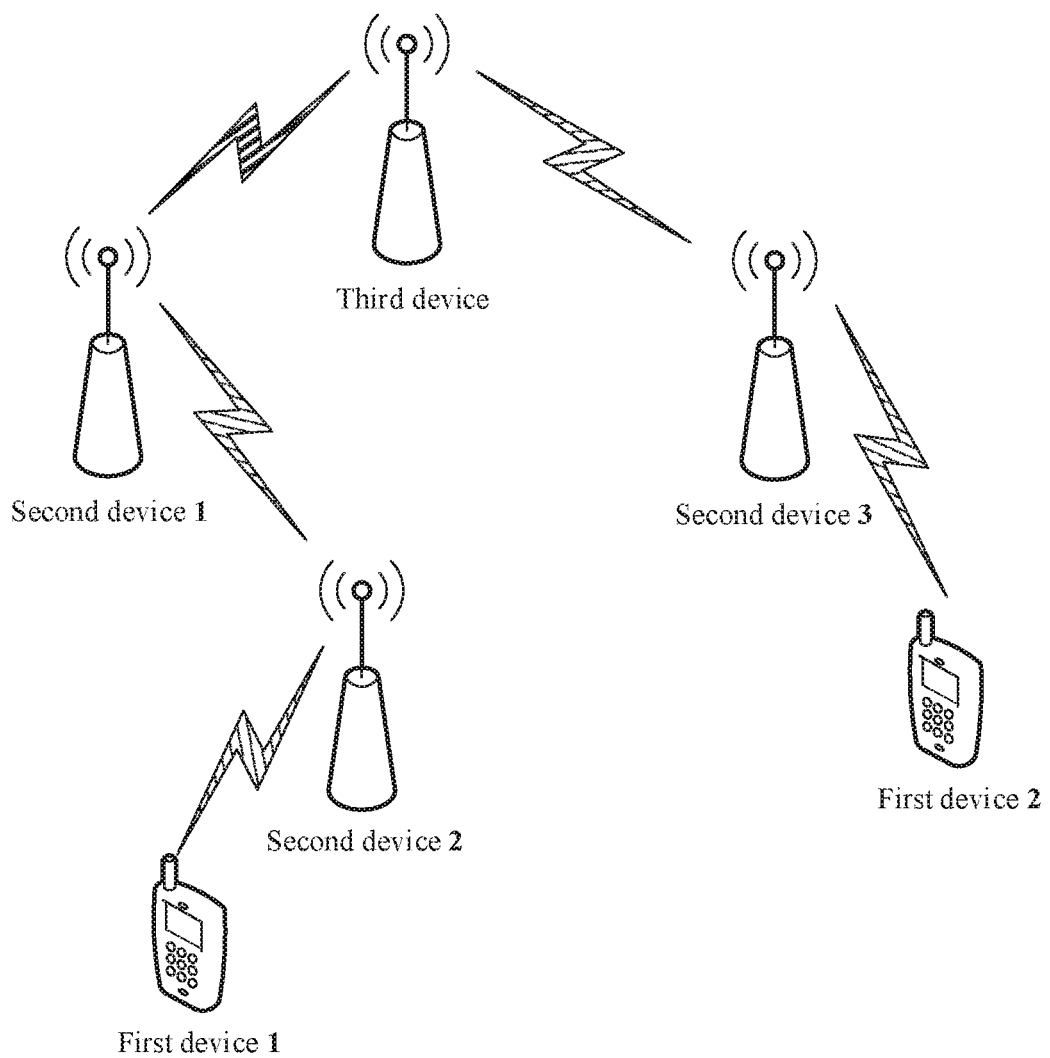
FIG. 14 is an architectural diagram of another system to which a power control method according to an embodiment of this application is applied.

The power control method provided in this embodiment of this application may also be applied to a scenario in which a first device is connected to a third device through a second device. FIG. 14 is a schematic architectural diagram of this scenario. The second device may be a relay node (Relay node), a transmission/reception point (transmission reception point, TRP), a relay transmission reception point (relay transmission reception point, rTRP), or a base station. The third device may be a radio access network (radio access network, RAN) device (or node), or may also be referred to as a base station. Currently, the RAN node may be, for example, a next generation NodeB (gNB), a transmission/reception point (transmission reception point, TRP), a donor transmission/reception point or donor transmission/reception point (donor transmission reception point, donor TRP), an anchor transmission reception point, anchor TRP), an evolved NodeB (evolved Node B, eNB), a radio network controller (radio network controller, RNC), a NodeB (Node B, NB), a base station controller (base station controller, BSC), a base transceiver station (base transceiver station, BTS), a home base station (for example, home evolved NodeB or home Node B, HNB), a baseband unit (base band unit, BBU), or a wireless fidelity (wireless fidelity, Wifi) access point (access point, AP). The first device is a terminal that communicates with the third device through the second device. The third device may be directly connected to a core network. The second device may be wirelessly connected to the third device. The second device may also be connected to the third device through at least one another second device. A link between the second device and the third device may be referred to as a backhaul link (backhaul link). A link between the second device and the first device may be referred to as an access link (access link). In this scenario, the power control method provided in this embodiment of this application is similar to a power control method in a scenario in which a first terminal is connected to a network device through a second terminal. The first terminal in the following may be replaced with the first device, the second terminal may be replaced with the second device, and the network device may be replaced with the third device. In other words, the first device performs steps performed by the first terminal, the second device performs steps performed by the second terminal, and the third device performs steps performed by the network device.

Figure 2:
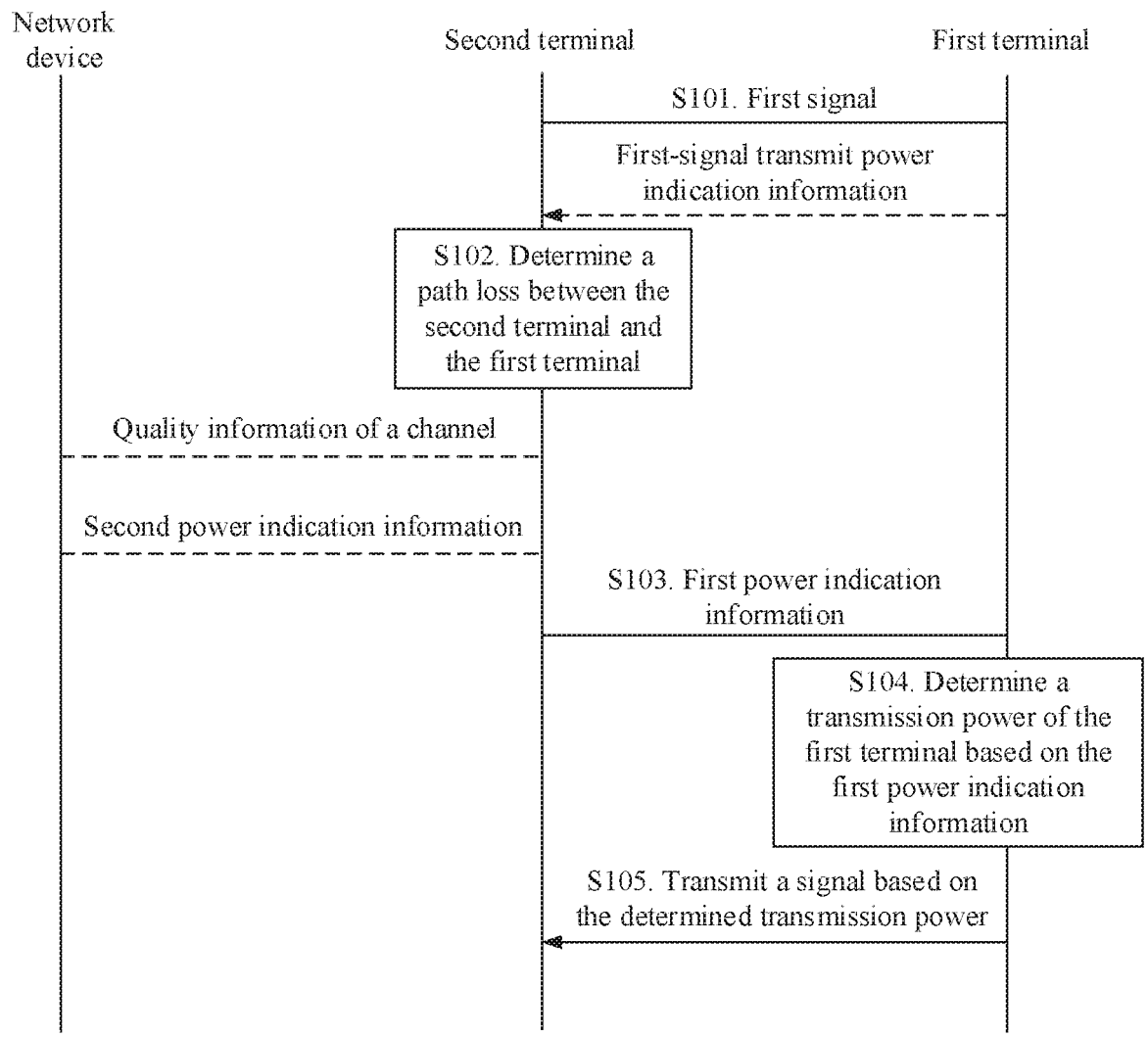
FIG. 2 is an implementation flowchart of a power control method according to an embodiment of this application.

FIG. 2 is an implementation flowchart of a power control method according to this application. Referring to FIG. 2, the method includes the following steps.

S101. A first terminal sends a first signal to a second terminal.

In this embodiment of this application, the first signal is used by the second terminal to determine a path loss between the second terminal and the first terminal based on a transmit power of the first signal.

The path loss may also be referred to as path attenuation. The path loss includes attenuation of a signal in a propagation process, and may further include another factor such as an antenna gain. For example, the path loss is attenuation of a signal during propagation, or a sum of attenuation of the signal during propagation, an antenna gain of a signal transmit end, and an antenna gain of a signal receive end.

It should be noted that, the path loss between the second terminal and the first terminal in this embodiment of this application may be equivalent to a path loss between the first terminal and the second terminal, or may be nonequivalent.

The first signal sent by the first terminal to the second terminal may be one of a reference signal transmitted on a physical sidelink discovery channel (physical sidelink discovery channel, PSDCH), a reference signal transmitted on a physical sidelink shared channel (physical sidelink shared channel, PSSCH), a reference signal transmitted on a physical sidelink control channel (physical sidelink control channel, PSCCH), a reference signal transmitted on a physical sidelink broadcast channel (physical sidelink broadcast channel, PSBCH), and an SL synchronization signal (sidelink synchronization signal, SLSS).

The first terminal may also send first-signal transmit power indication information to the second terminal, where the first-signal transmit power indication information is used to indicate a power at which the first terminal sends the first signal.

Specifically, the first-signal transmit power indication information may be transmitted by using a radio resource control (radio resource control, RRC) message, or a medium access control control element (medium access control control element, MAC CE), or sidelink control information (sidelink control information, SCI). When the first signal is a reference signal transmitted on a PSDCH, the first-signal transmit power indication information may alternatively be transmitted by using a discovery message. Specifically, the first-signal transmit power indication information may be transmitted by using an information element (information element) that is included in the discovery message and that is used to indicate the first-signal transmit power indication information. Further, the first-signal transmit power indication information may be sent by using an information element that is in the discovery message and that is used to indicate a terminal identifier, or the first-signal transmit power indication information may be carried in a newly added information element.

In a possible implementation, when the first terminal sends a discovery message used for a UE-to-network relay discovery solicitation (UE-to-Network Relay Discovery Solicitation), an information element that is in the discovery message and that is used to indicate a terminal identifier may be optional. In this case, the first-signal transmit power indication information may be transmitted by using the following two methods: (1) When the information element that is used to indicate the terminal identifier is included in the discovery message, an information element used to carry the first-signal transmit power indication information is included in the discovery message; or when the information element that is used to indicate the terminal identifier is not included in the discovery message, an information element used to carry the first-signal transmit power indication information is not included in the discovery message. (2) When the information element that is used to indicate the terminal identifier is included in the discovery message, an information element used to carry the first-signal transmit power indication information is not included in the discovery message: or when the information element that is used to indicate the terminal identifier is not included in the discovery message, an information element used to carry the first-signal transmit power indication information is transmitted by using a bit occupied by the information element that is used to indicate the terminal identifier.

Further, the first terminal may periodically send the first-signal transmit power indication information. For example, a timer may be defined. If the first terminal needs to send the first-signal transmit power indication information, the timer is started, and when the timer expires, the first-signal transmit power indication information is sent.

In this embodiment of this application, the second terminal may send request indication information. The request indication information is used to instruct the first terminal to send the first-signal transmit power indication information. After receiving the request indication information sent by the second terminal, the first terminal sends the first-signal transmit power indication information. The second terminal may determine that the request indication information is sent depending on a change status of the path loss between the second terminal and the first terminal. For example, when the path loss between the second terminal and the first terminal changes greatly or quickly, an interval at which the second terminal sends the request indication information is smaller. Alternatively, when a change value of the path loss between the second terminal and the first terminal is greater than or equal to a threshold, the second terminal sends the request indication information.

It may be understood that, another method for transmitting the first-signal transmit power indication information is not excluded in this application.

Certainly, the second terminal may determine the path loss between the second terminal and the first terminal in another manner, and manners are not limited to the manner in which the first terminal sends the first signal. Therefore, if the second terminal determines the path loss between the second terminal and the first terminal in another manner, or the second terminal does not need to determine the path loss between the second terminal and the first terminal, step S101 is optional.

S102. The second terminal receives the first signal sent by the first terminal, and determines the path loss between the second terminal and the first terminal based on a transmit power of the first signal.

The transmit power of the first signal may be a preset fixed power value, or may be indicated by using the first-signal transmit power indication information sent by the first terminal to the second terminal, or may be configured by the second terminal or a network device, or may be preconfigured.

The second terminal in this embodiment of this application may measure a first-signal receive power at which the second terminal receives the first signal, and determine the path loss between the second terminal and the first terminal based on the first-signal receive power and a first-signal transmit power. Specifically, the path loss between the second terminal and the first terminal may be understood as a difference between the first-signal transmit power and the first-signal receive power.

Optionally, the first terminal may send the first signal to the second terminal for a plurality of times, and the second terminal may perform filtering on a plurality of first-signal receive powers at which the first signal is received for a plurality of times, and determine the path loss between the second terminal and the first terminal based on a filtered receive power.

It should be noted that in this embodiment of this application, if the second terminal does not need to determine the path loss between the second terminal and the first terminal, step S102 is optional.

S103. The second terminal sends first power indication information to the first terminal.

After determining the path loss between the second terminal and the first terminal, the second terminal may determine the first power indication information based on the path loss between the second terminal and the first terminal, and send the first power indication information to the first terminal, where the first power indication information is used by the first terminal to determine a transmission power, and the transmission power may be a transmission power used when any one of a PSSCH, a PSCCH, a PSBCH, a PSDCH, and an SLSS is transmitted.

In a possible implementation, a power indicated in the first power indication information may be determined by the second terminal based on a first power value and the path loss between the second terminal and the first terminal. For example, the power indicated in the first power indication information may be a sum of the first power value and a first parameter, the first parameter may be a product of the path loss and a second parameter, and the second parameter may be indicated by the network device to the second terminal.

For example, the power indicated in the first power indication information is $P_0+\alpha \cdot PL$, where $P_0$ is the first power value, $\alpha \cdot PL$ is the first parameter, $\alpha$ is the second parameter, and PL is the path loss.

The first power value may be a power value determined by the second terminal based on quality information, obtained by the second terminal through measurement, of a channel for communication between the first terminal and the second terminal. In this embodiment of this application, the quality information of the channel includes at least one of a receive interference level, signal received quality, and received signal strength. For example, the second terminal may determine the first power value based on a received signal strength indicator (Received Signal Strength Indicator, RSSI) or reference signal received quality (Reference signal received quality, RSRQ) that is obtained through measurement. The second terminal may measure the quality information of the channel on a resource on which a signal sent by the first terminal may be received. For example, the second terminal measures the quality information of the channel on a receiving resource pool of the second terminal, or the second terminal measures the quality information of the channel on a sending resource pool of the first terminal. Alternatively, the second terminal may determine the first power value based on the quality information, obtained by the second terminal through measurement, of the channel for communication between the first terminal and the second terminal and a parameter that is configured by the network device or a pre-configured or preset parameter. For example, the second terminal determines that the first power value is a product of the quality information of the channel and the parameter that is configured by the network device or a pre-configured or preset parameter. Alternatively, the second terminal determines the first power value based on the quality information of the channel, and the first power value is not greater than the parameter that is configured by the network device or a pre-configured or preset parameter.

Alternatively, the first power value may be determined by the second terminal based on second power indication information sent by the network device to the second terminal. The first power value indicated in the second power indication information may be specific to a terminal, in other words, the first power value may be configured independently for different terminals. The first power value indicated in the second power indication information may be specific to a resource pool, in other words, the first power value may be configured independently for different resource pools. The first power value indicated in the second power indication information may be specific to a terminal, and may also be specific to a resource pool, in other words, the first power value may be configured independently for different terminals in different resource pools.

The network device may determine the first power value based on a resource usage status of receiving resources by the second terminal. Specifically, the second terminal may send channel information to the network device, the channel information is used to indicate quality information of a channel for communication between the first terminal and the second terminal, and the network device may determine the first power value based on the channel information sent by the second terminal.

The manner in which the network device determines the first power value based on the channel information sent by the second terminal may be similar to the method in which the second terminal determines the first power value based on the channel information.

Trigger conditions for the second terminal to send the channel information to the network device may include at least one of the following: (1) When a change value of the quality information of the channel for communication between the first terminal and the second terminal is greater than or equal to a threshold, the second terminal sends the quality information of the channel for communication between the first terminal and the second terminal; (2) The second terminal periodically sends the quality information of the channel for communication between the first terminal and the second terminal to the network device; and (3) After a direct connection is established between the second terminal and the first terminal for the last time, if the second terminal has not sent the channel information, the second terminal sends the channel information that is used to indicate the quality information of the channel for communication between the first terminal and the second terminal.

In another possible implementation, the power indicated in the first power indication information may alternatively be a power adjustment value.

Optionally, in this embodiment of this application, an implementation in which the second terminal may send the first power indication information to the network device, and the network device receives the first power indication information sent by the second terminal, and sends the first power indication information to the first terminal is applicable to an application scenario in which the first terminal does not receive a signal on a sidelink, and the implementation is not shown in the figure.

S104. The first terminal determines a transmission power of the first terminal based on the first power indication information.

In this embodiment of this application, the first terminal may determine, based on the power indicated in the first power indication information, the transmission power at which the first terminal transmits a signal. Optionally, the first terminal may determine, the transmission power at which the first terminal transmits a signal, based on the power indicated in the first power indication information and with reference to at least one of a bandwidth for transmission of the signal and a modulation and coding scheme (modulation and coding scheme, MCS) for transmission of the signal. If the first terminal determines the transmission power based on the MCS and the power indicated in the first power indication information, the MCS may be an MCS parameter or a parameter reflecting the MCS (for example, a ratio of a size of a code block and a quantity of resource elements).

For example, the transmission power of the first terminal may meet one of the following formulas:

$P$=Power indicated in first power indication information.

$P$=Power indicated in first power indication information+10 $\log_{10}(M)$; and $P$=Power indicated in first power indication information+10 $\log_{10}(M)$+$\Delta_{TF}$;

Herein, P is the transmission power of the first terminal, M is a bandwidth of a resource used when the first terminal transmits the signal, and $\Delta_{TF}$ is a parameter determined based on the MCS.

Assuming that the power indicated in the first power indication information is $P_0 + \alpha \cdot PL$, where $P_0$ is the first power value, $\alpha \cdot PL$ is the first parameter, $\alpha$ is the second parameter, and PL is the path loss. In this case, the transmission power of the first terminal may meet the following formula:

$P$=10 $\log_{10}(M)$+$P_0$+$\alpha \cdot PL$+$\Delta_{TF}$

Optionally, the transmission power of the first terminal is not greater than a maximum transmission power. In this case, the transmission power of the first terminal may meet one of the following formulas:

$P$=min{$P_{MAX}$,Power indicated in first power indication information};

$P$=min{$P_{MAX}$,Power indicated in first power indication information+10 $\log_{10}(M)$+$\Delta_{TF}$}; and $P$=min{$P_{MAX}$,Power indicated in first power indication information+10 $\log_{10}(M)$+$\Delta_{TF}$}.

Herein, $P_{MAX}$ is the maximum transmission power, and min{ } indicates a minimum value.

When the power indicated in the first power indication information is the power adjustment value, the first terminal may determine the transmission power of the first terminal based on a power reference value of a previous transmitted signal and the power adjustment value.

Optionally, the first terminal may determine the transmission power at which the first terminal transmits a signal, based on the power reference value of the previous transmitted signal and the power adjustment value and with reference to at least one of the bandwidth for transmitting the signal and the modulation and coding scheme (modulation and coding scheme, MCS) for transmitting the signal.

For example, the transmission power of the first terminal may meet one of the following formulas:

$P_i = P_{i-1}'$+Power indicated in first power indication information;

$P_i = P_{i-1}'$+Power indicated in first power indication information+10 $\log_{10}(M_i)$; and $P_i = P_{i-1}'$+Power indicated in first power indication information+10 $\log_{10}(M_i)$+$\Delta_{TF,i}$.

Specifically, $P_i' = P_{i-1}'$+Power indicated in the first power indication information, and $P_{i-1}' = P_i'$−Power indicated in the first power indication information.

Herein, $P_i$ is a transmission power of the first terminal at an $i^{th}$ time, $P_i'$ is a power reference value used when the first terminal transmits a signal at an $i^{th}$ time, $M_i$ is a bandwidth of a resource used when the first terminal transmits a signal at an $i^{th}$ time, and $\Delta_{TF,i}$ is a parameter determined based on an MCS used when a signal is transmitted at an $i^{th}$ time.

Optionally, the transmission power of the first terminal is not greater than a maximum transmission power. In this case, the transmission power of the first terminal may meet one of the following formulas:

$P_i$=min{$P_{MAX}$,$P_{i-1}'$+Power indicated in first power indication information};

$P_i$=min{$P_{MAX}$,$P_{i-1}'$+Power indicated in first power indication information+10 $\log_{10}(M_i)$}; and $P_i$=min{$P_{MAX}$,$P_{i-1}'$+Power indicated in first power indication information+10 $\log_{10}(M_i)$+$\Delta_{TF,i}$}.

Herein, $P_{MAX}$ is the maximum transmission power, and min{ } indicates a minimum value.

S105. The first terminal transmits a signal to the second terminal based on the determined transmission power.

According to the transmission power control method provided in this embodiment of this application, the second terminal determines the path loss between the second terminal and the first terminal, determines the first power indication information based on the path loss between the second terminal and the first terminal, and sends the first power indication information to the first terminal, and the first terminal determines the transmission power based on the first power indication information, so that a more accurate power can be determined, and therefore signal transmission can be performed based on the determined transmission power, to avoid, to some extent, using a power higher than an actually required transmission power to perform signal transmission.

In this embodiment of this application, after determining the path loss between the second terminal and the first terminal, the second terminal may send path loss indication information to the network device, and the path loss indication information is used to indicate the path loss between the second terminal and the first terminal. The path loss indication information may alternatively indicate an increment of the path loss, and the first terminal may use a sum of a previous path loss and the increment as a new path loss value. The network device determines the first power indication information based on the path loss that is between the second terminal and the first terminal and that is indicated in the path loss indication information, and sends the first power indication information to the first terminal, and the first terminal determines the transmission power based on the first power indication information. This manner may be applied to a case in which the first terminal does not receive a signal on a sidelink.

It should be noted that, before the first terminal determines the transmission power based on the foregoing procedure, the first terminal may use a transmission power of an existing sidelink as the transmission power.

Figure 3:
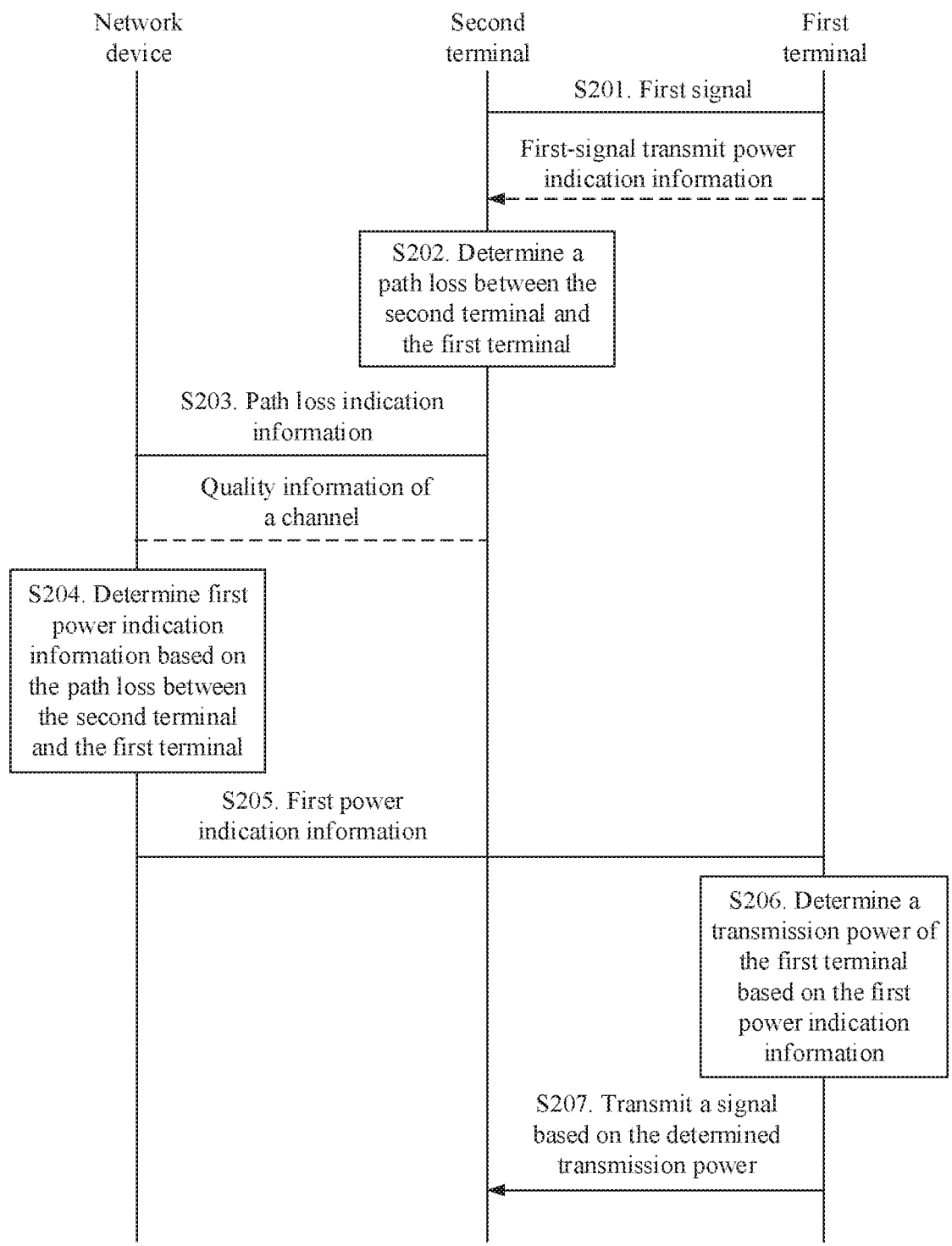
FIG. 3 is another implementation flowchart of a power control method according to an embodiment of this application.

FIG. 3 is another implementation flowchart of a transmission power control method according to an embodiment of this application. In execution steps shown in FIG. 3, execution steps of S201, S202, S206 and S207 are respectively similar to the execution steps of S101, S102, S104, and S105 shown in FIG. 2. Details are not described herein again. A difference is as follows:

S203. The second terminal sends path loss indication information to a network device, where the path loss indication information is used to indicate the path loss between the second terminal and the first terminal.

S204. The network device determines first power indication information based on the path loss that is between the second terminal and the first terminal and that is indicated in the path loss indication information.

The second terminal may send, to the network device, quality information, obtained by the second terminal through measurement, of a channel for communication between the first terminal and the second terminal; and the network device may determine the first power indication information based on the quality information that is of the channel for communication between the second terminal and the first terminal and that is sent by the second terminal and the path loss between the second terminal and the first terminal.

Specifically, the network device may determine a first power value based on the quality information that is of the channel for communication between the second terminal and the first terminal, that is obtained by the second terminal through measurement, and that is sent by the second terminal, and determine the first power indication information based on the first power value and the path loss between the second terminal and the first terminal.

A determining manner of the first power value and a power indicated in the first power indication information may be determined by using a specific implementation in the foregoing embodiment. Details are not described herein again.

In this embodiment of this application, for an implementation process in which the network device determines the first power indication information based on the path loss between the second terminal and the first terminal, reference may be made to the foregoing implementation process in which the second terminal determines the first power indication information based on the path loss between the second terminal and the first terminal. Details are not described herein again.

S205. The network device sends the first power indication information to the first terminal.

According to the transmission power control method provided in this embodiment of this application, the second terminal determines the path loss between the second terminal and the first terminal, and sends the path loss indication information to the network device, the network device determines the first power indication information based on the path loss that is between the second terminal and the first terminal and that is indicated in the path loss indication information, and sends the first power indication information to the first terminal, and the first terminal determines the transmission power based on the first power indication information, so that a more accurate power can be determined, and therefore signal transmission can be performed based on the determined transmission power, to avoid, to some extent, using a power higher than an actually required transmission power to perform signal transmission. In addition, the method is applicable to an application scenario in which the first terminal does not receive a signal on a sidelink.

In the foregoing methods shown in FIG. 2 and FIG. 3 in the embodiments of this application, the first power indication information is determined by the second terminal or the network device. In other words, the power used for the first terminal to determine the transmission power is determined by the second terminal or the network device based on the path loss between the second terminal and the first terminal. However, during specific implementation, the transmission power may alternatively be directly determined by the first terminal based on the path loss between the second terminal and the first terminal. This is described in the following with reference to specific embodiments.

Figure 4:
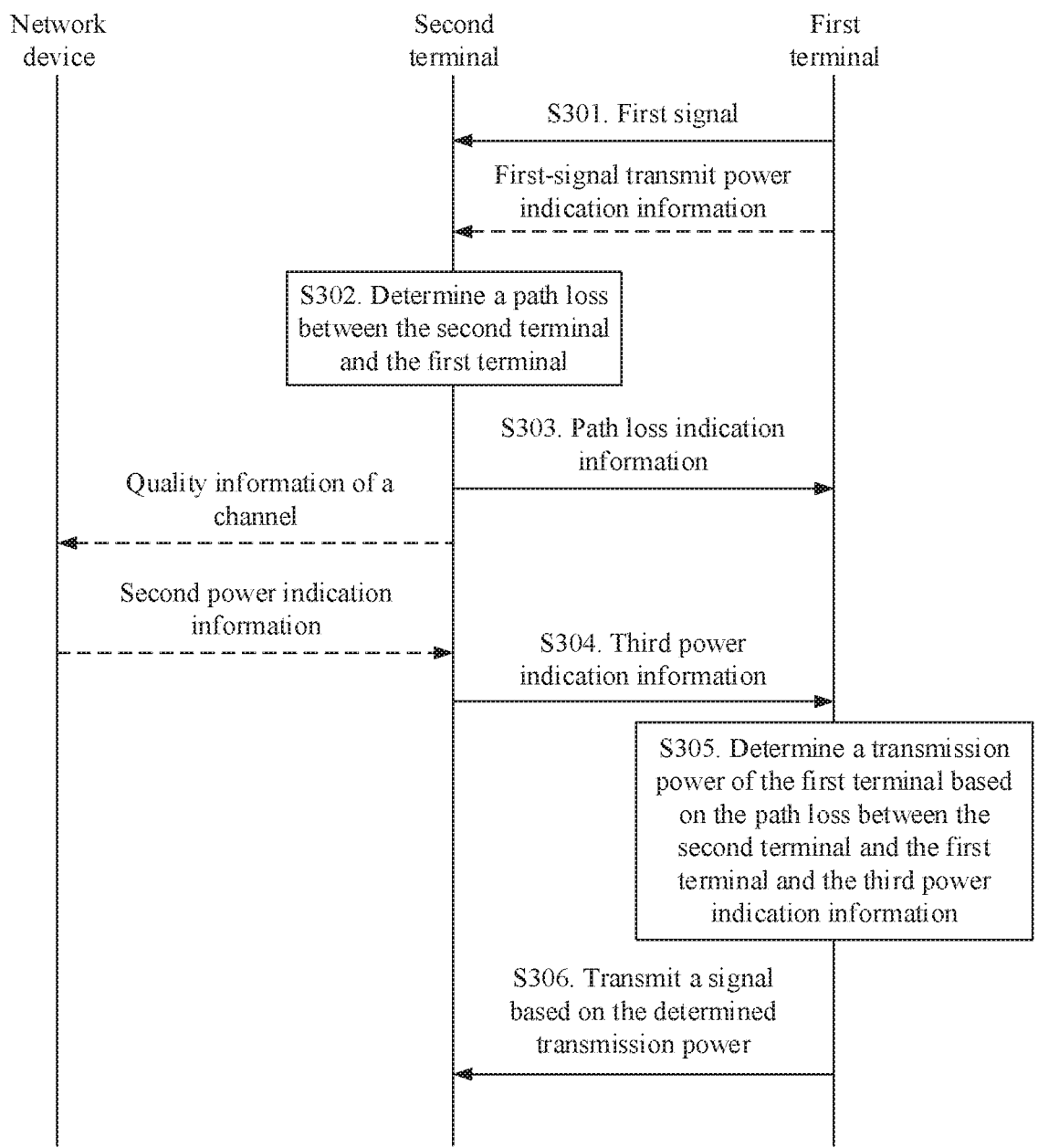
FIG. 4 is still another implementation flowchart of a power control method according to an embodiment of this application.

FIG. 4 is still another implementation flowchart of a transmission power control method according to an embodiment of this application.

In execution steps of the method shown in FIG. 4, execution steps of S301 and S302 are similar to the execution steps of S101 and S102 in FIG. 2. Details are not described herein again.

S303. The second terminal sends path loss indication information to the first terminal, where the path loss indication information is used to indicate the path loss between the second terminal and the first terminal.

In this embodiment of this application, after determining the path loss between the second terminal and the first terminal, the second terminal may send the path loss indication information to the first terminal, so that the first terminal determines a transmission power of the first terminal based on the path loss indicated in the path loss indication information.

Optionally, in this embodiment of this application, the second terminal may send information used to indicate a path loss to a network device, and the network device receives the information that is used to indicate the path loss and that is sent by the second terminal, and sends the path loss indication information to the first terminal, so that the implementation is applicable to an application scenario in which the first terminal does not receive a signal on a sidelink. The implementation is not shown in the figure.

S304. The second terminal or the network device sends third power indication information to the first terminal.

In this embodiment of this application, when the second terminal sends the third power indication information to the first terminal, the third power indication information may be determined by the second terminal based on quality information, obtained by the second terminal through measurement, of a channel for communication between the second terminal and the first terminal; or the third power indication information is determined by the second terminal based on second power indication information sent by the network device to the second terminal.

An implementation in which the third power indication information may be determined by the second terminal based on the quality information, obtained by the second terminal through measurement, of the channel for communication between the second terminal and the first terminal may be similar to the implementation process in the foregoing embodiment in which the second terminal determines the second power indication information based on the quality information, obtained by the second terminal through measurement, of the channel for communication between the second terminal and the first terminal. Details are not described herein again.

In a possible implementation, in this embodiment of this application, the network device may determine a first power value, the network device may send second power indication information to the second terminal, and the second terminal determines the third power indication information based on the second power indication information sent by the network device to the second terminal, and sends the third power indication information to the first terminal. The network device may determine the first power value by using the manner of determining the first power value in the foregoing embodiment.

Specifically, the second terminal may send, to the network device, quality information, obtained by the second terminal through measurement, of a channel for communication between the first terminal and the second terminal; and the network device determines the first power value based on the quality information that is of the channel for communication between the first terminal and the second terminal, that is obtained by the second terminal through measurement, and that is sent by the second terminal.

Optionally, in this embodiment of this application, the second terminal may send the third power indication information to the network device, the network device receives the third power indication information sent by the second terminal, and the network device sends the third power indication information to the first terminal, so that the method is applicable to an application scenario in which the first terminal does not receive a signal on a sidelink. The implementation is not shown in the figure.

In this embodiment of this application, when the third power indication information is sent by the network device to the first terminal, the first power value indicated in the third power indication information may be determined by the network device, or may be determined by the second terminal, the second terminal sends indication information used to indicate the first power value to the network device, and the network device further determines the first power value based on the indication information that is used to indicate the first power value and that is sent by the second terminal.

Optionally, the second terminal or the network device sends the third power indication information used to indicate the first power value to the first terminal, so that the first terminal determines the transmission power based on the first power value indicated in the second power indication information and the path loss that is between the second terminal and the first terminal and that is indicated in the path loss indication information.

In FIG. 4 in this embodiment of this application, that the second terminal sends the third power indication information to the first terminal is used as an example for description. A case in which the network device sends the third power indication information to the first terminal is not shown in FIG. 4.

S305. The first terminal receives the third power indication information, and receives the path loss indication information. The first terminal determines the transmission power of the first terminal based on the path loss between the second terminal and the first terminal and the third power indication information.

Optionally, the first terminal may determine the transmission power at which the first terminal transmits a signal based on the path loss between the second terminal and the first terminal and the third power indication information and with reference to at least one of a bandwidth for transmission of the signal and a modulation and coding scheme (modulation and coding scheme, MCS) for transmission of the signal.

For example, if the first terminal determines the transmission power with reference to the MCS, the MCS may be an MCS parameter or a parameter reflecting the MCS (for example, a ratio of a size of a code block and a resource element), and the transmission power of the first terminal may meet one of the following formulas:

$$P = P_0 + \alpha \cdot PL;$$

$$P = 10 \log_{10}(M) + P_0 + \alpha \cdot PL; \text{ and}$$

$$P = 10 \log_{10}(M) + P_0 + \alpha \cdot PL + \Delta_{TF}.$$

Herein, P is the transmission power of the first terminal. M is a bandwidth of a resource used when the first terminal transmits the signal. $P_0$ is the first power value, $\alpha \cdot PL$ is a first parameter, $\alpha$ is a parameter configured by the network device or the second terminal, or may be pre-configured or preset, PL is the path loss, and $\Delta_{TF}$ is a parameter determined based on the MCS. Optionally, the transmission power of the first terminal is not greater than a maximum transmission power. In this case, the transmission power of the first terminal may meet one of the following formulas:

$$P = \min\{P_{MAX}, P_0 + \alpha \cdot PL\};$$

$$P = \min\{P_{MAX}, P_0 + \alpha \cdot PL + 10 \log_{10}(M)\}; \text{ and}$$

$$P = \min\{P_{MAX}, 10 \log_{10}(M) + P_0 + \alpha \cdot PL + \Delta_{TF}\}.$$

Herein, $P_{MAX}$ is the maximum transmission power, and min{ } indicates a minimum value.

Optionally, the first power value indicated in the second power indication information may alternatively be a power adjustment value. The first terminal may determine the transmission power based on a power reference value of a previous transmitted signal, the path loss between the second terminal and the first terminal, and the power adjustment value.

Optionally, the first terminal may further determine the transmission power at which the first terminal transmits a signal with reference to a bandwidth for transmission of the signal and a modulation and coding scheme (modulation and coding scheme, MCS) for transmission of the signal. In this case, the transmission power of the first terminal may meet one of the following formulas:

$$P_i = P_{i-1}' + P_0 + \alpha \cdot PL;$$

$$P_i = P_{i-1}' + P_0 + \alpha \cdot PL + 10 \log_{10}(M_i);$$

$$P_i = P_{i-1}' + P_0 + \alpha \cdot PL + 10 \log_{10}(M_i) + \Delta_{TF,i}.$$

Specifically, if $P_i' = P_{i-1}' + P_0$, $P_{i-1}' = P_i' - P_0$.

Herein, $P_i$ is a transmission power of the first terminal at an $i^{th}$ time, $P_i'$ is a power reference value used when the first terminal transmits a signal at an $i^{th}$ time, $M_i$ is a bandwidth of a resource used when the first terminal transmits a signal at an $i^{th}$ time, and $\Delta_{TF,i}$ is a parameter determined based on an MCS used when a signal is transmitted at an $i^{th}$ time.

Optionally, the transmission power of the first terminal is not greater than a maximum transmission power. In this case, the transmission power of the first terminal may meet one of the following formulas:

$$P_i = \min\{P_{MAX}, P_{i-1}' + P_0 + \alpha \cdot PL\};$$

$$P_i = \min\{P_{MAX}, P_{i-1}' + P_0 + \alpha \cdot PL + 10 \log_{10}(M_i)\}; \text{ and}$$

$$P_i = \min\{P_{MAX}, P_{i-1}' + P_0 + \alpha \cdot PL + 10 \log_{10}(M_i) + \Delta_{TF,i}\}.$$

Herein, $P_{MAX}$ is the maximum transmission power, and min{ } indicates a minimum value.

S306. The first terminal transmits a signal to the second terminal based on the determined transmission power.

According to the transmission power control method provided in this embodiment of this application, the second terminal determines the path loss between the second terminal and the first terminal, and sends the path loss indication information and the second power indication information to the first terminal, and the first terminal determines the transmission power based on the path loss between the second terminal and the first terminal and the second power indication information, so that a more accurate power can be determined, and therefore signal transmission can be performed based on the determined transmission power, to avoid, to some extent, using a power higher than an actually required transmission power to perform signal transmission.

In each of the foregoing embodiments of this application, the path loss between the second terminal and the first terminal is determined by the second terminal. During actual implementation, the path loss between the second terminal and the first terminal may alternatively be determined by the first terminal. The following provides description with reference to actual application.

Figure 5:
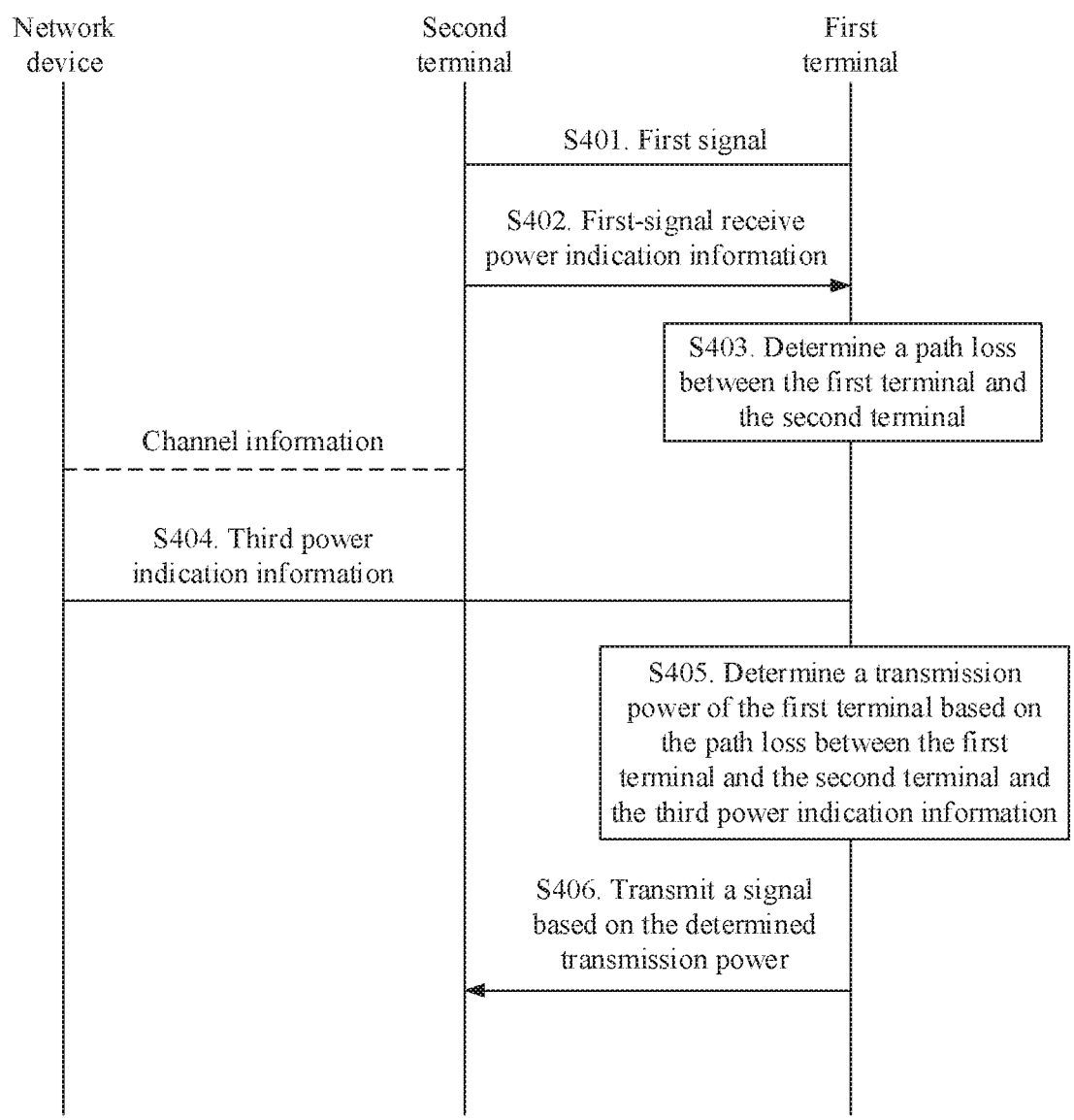
FIG. 5 is yet another implementation flowchart of a power control method according to an embodiment of this application.

FIG. 5 is yet another implementation flowchart of a transmission power control method according to an embodiment of this application. Referring to FIG. 5, the method includes the following steps.

S401. A first terminal sends a first signal to a second terminal.

For an implementation process in which the first terminal sends the first signal to the second terminal, reference may be made to the implementation process in the foregoing method shown in FIG. 2.

S402. The second terminal receives the first signal sent by the first terminal, and determines first-signal receive power indication information, where the first-signal receive power indication information is used to indicate a receive power at which the second terminal receives the first signal. The second terminal sends the first-signal receive power indication information to the first terminal.

Optionally, the first terminal may send the first signal to the second terminal for a plurality of times, and the second terminal may perform filtering on a plurality of first-signal receive powers at which the first signal is received for a plurality of times. The first-signal receive power indication information indicates a filtered receive power.

S403. The first terminal receives the first-signal receive power indication information sent by the second terminal, and determines a path loss between the first terminal and the second terminal based on the first-signal receive power indication information.

Specifically, the first terminal may determine the path loss between the first terminal and the second terminal based on the power indicated in the first-signal receive power and a first-signal transmit power, where the first-signal transmit power is a transmit power at which the first terminal sends the first signal. The path loss between the first terminal and the second terminal may be understood as a difference between the first-signal transmit power and the power indicated in the first-signal receive power.

Optionally, in this embodiment of this application, the second terminal may send the first-signal receive power indication information to a network device; the network device receives the first-signal receive power indication information sent by the second terminal, and sends the first-signal receive power indication information to the first terminal; and the first terminal receives the first-signal receive power indication information sent by the network device, and determines the path loss between the first terminal and the second terminal based on the first-signal receive power indication information. The method may be applicable to an application scenario in which the first terminal does not receive a signal on a sidelink. The implementation is not shown in the figure.

S404. The first terminal receives third power indication information sent by the second terminal or the network device.

Specifically, for an implementation process in which the second terminal or the network device determines the third power indication information, an implementation process in which the second terminal or the network device determines the third power indication information in the foregoing embodiments may be used. For details, reference may be made to the implementation process in the foregoing related embodiment, and the details are not described herein again.

In FIG. 5, that the first terminal receives the third power indication information sent by the network device is used as an example for description, and does not impose a limitation.

S405. The first terminal determines a transmission power of the first terminal based on the third power indication information and the path loss between the first terminal and the second terminal.

S406. The first terminal transmits a signal to the second terminal based on the determined transmission power.

According to the transmission power control method provided in this embodiment of this application, the first terminal determines the path loss between the first terminal and the second terminal, receives the third power indication information sent by the second terminal or the network device, and determines the transmission power based on the path loss between the first terminal and the second terminal and the third power indication information, so that a more accurate power can be determined, and therefore signal transmission can be performed based on the determined transmission power, to avoid, to some extent, using a power higher than an actually required transmission power to perform signal transmission.

Figure 6:
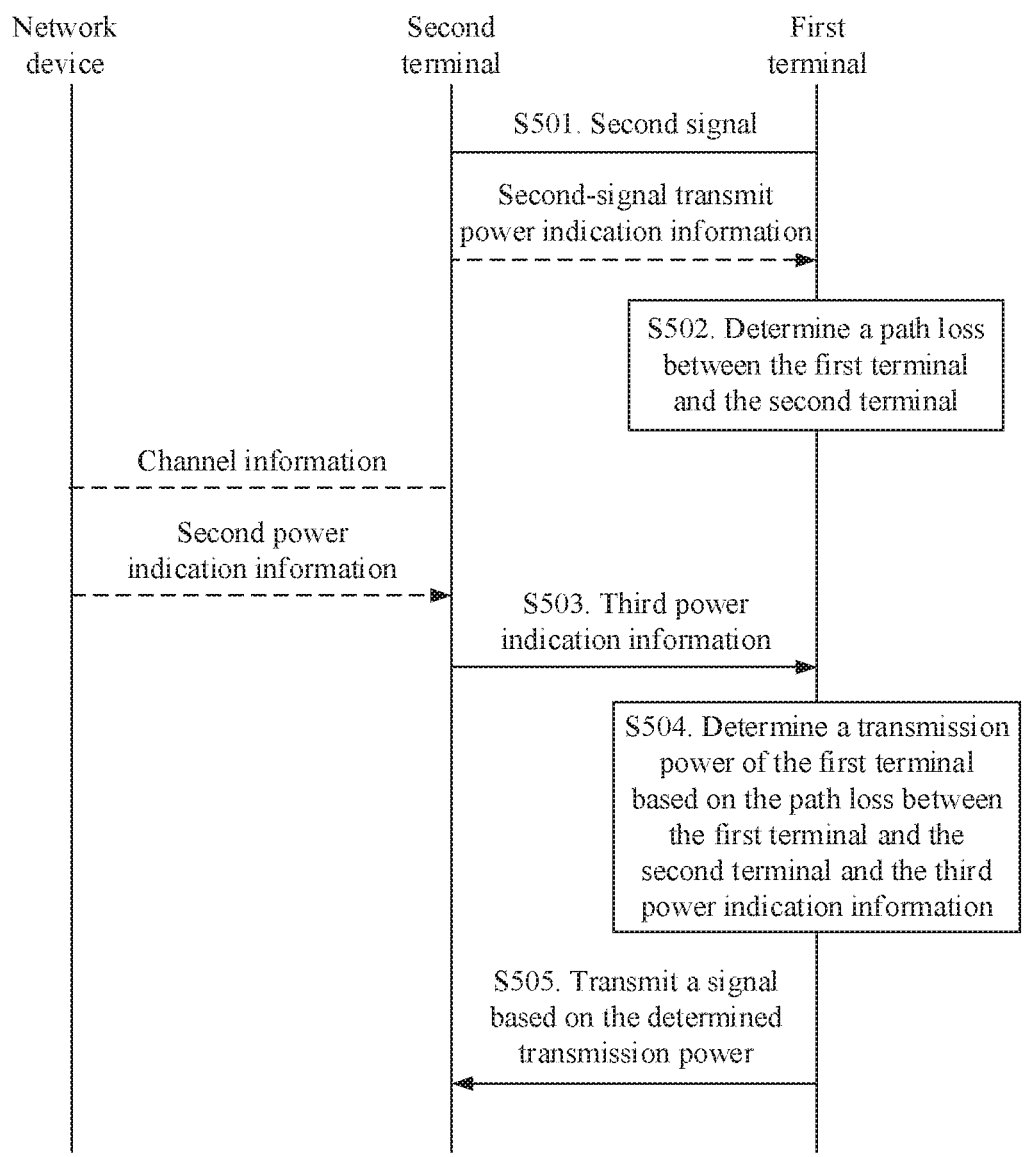
FIG. 6 is a still yet another implementation flowchart of a power control method according to an embodiment of this application.

FIG. 6 is a still yet another implementation flowchart of a transmission power control method according to an embodiment of this application. Referring to FIG. 6, the method includes the following steps.

S501. A second terminal sends a second signal to a first terminal, where the second signal is used by the first terminal to determine a path loss between the first terminal and the second terminal based on a transmit power of the second signal.

In this embodiment of this application, the second signal sent by the second terminal to the first terminal is similar to the first signal sent by the first terminal to the second terminal in the foregoing embodiments. A difference lies in that the first signal is used by the second terminal to determine a path loss between the second terminal and the first terminal, and the second signal is used by the first terminal to determine the path loss between the first terminal and the second terminal.

S502. The first terminal receives the second signal sent by the second terminal, and determines the path loss between the first terminal and the second terminal based on the second signal.

The first terminal may determine the path loss between the first terminal and the second terminal based on a receive power at which the first terminal receives the second signal and the transmit power at which the second terminal sends the second signal. For example, the path loss between the first terminal and the second terminal may be a difference between the transmit power at which the second terminal sends the second signal and the receive power at which the first terminal receives the second signal.

Optionally, the second terminal may send the second signal to the first terminal for a plurality of times, and the first terminal may perform filtering on a plurality of second-signal receive powers at which the second signal is received for a plurality of times, and determine the path loss between the first terminal and the second terminal based on a filtered receive power.

In a possible implementation, the transmit power at which the second terminal sends the second signal may be a fixed value, or may be configured by a network device, or may be pre-configured. In this case, the first terminal may use a predefined manner to determine the transmit power at which the second terminal sends the second signal. In another possible implementation, the transmit power at which the second terminal sends the second signal may be indicated by using second-signal transmit power indication information sent by the second terminal to the first terminal, where the second-signal transmit power indication information is used to indicate the transmit power at which the second terminal sends the second power.

S503. The first terminal receives third power indication information sent by the second terminal or the network device.

Specifically, for an implementation process in which the second terminal or the network device determines the third power indication information, an implementation process in which the second terminal or the network device determines the third power indication information in the foregoing embodiments may be used. For details, reference may be made to the implementation process in the foregoing related embodiment, and the details are not described herein again.

Figure 7:
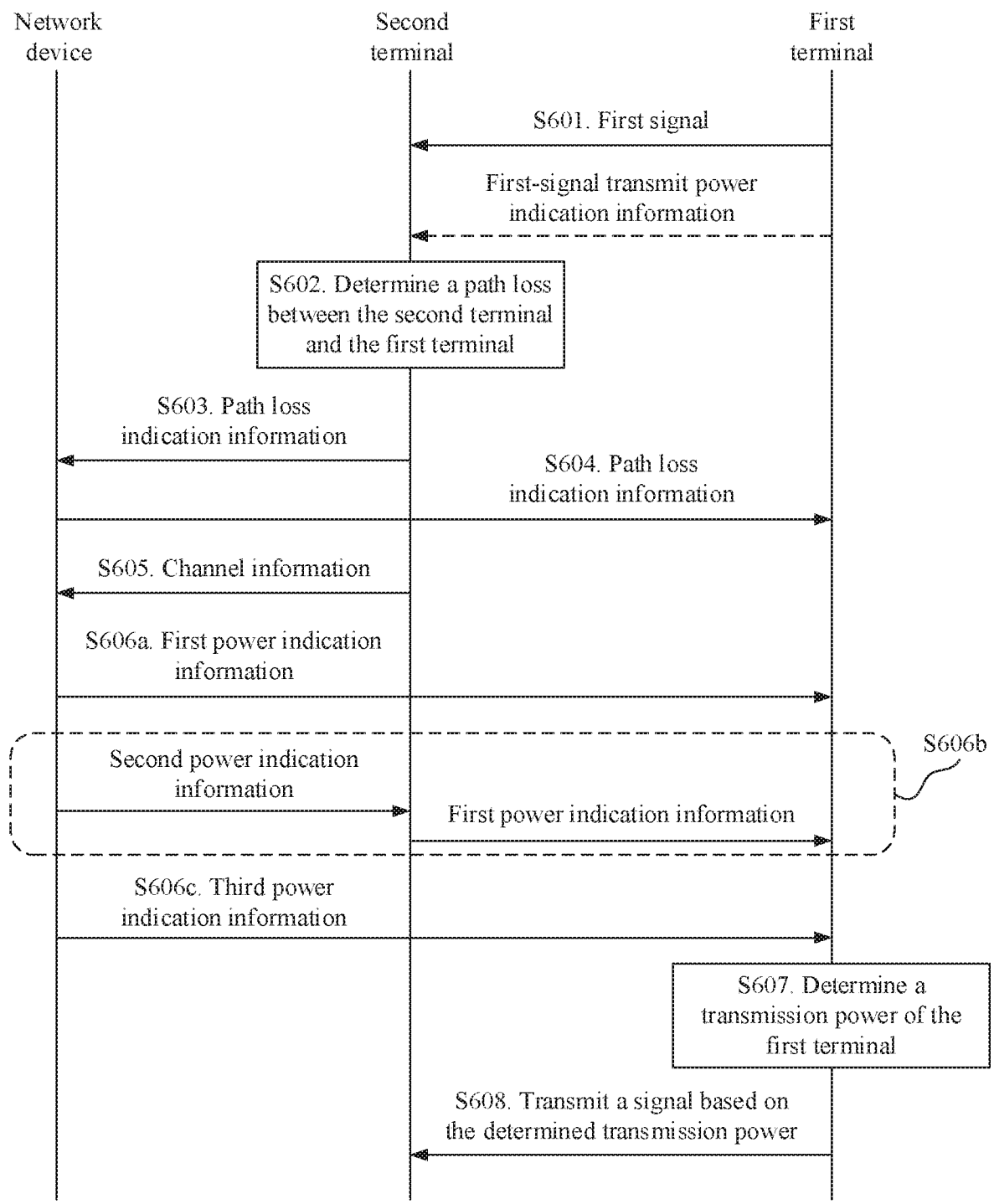
FIG. 7 is a further implementation flowchart of a power control method according to an embodiment of this application.

In FIG. 7, that the first terminal receives the third power indication information sent by the second terminal is used as an example for description, and does not impose a limitation.

The third power indication information that is sent by the second terminal and that is received by the first terminal may be determined by the second terminal, or may be determined based on second power indication information sent by the network device to the second terminal.

S504. The first terminal determines a transmission power of the first terminal based on the third power indication information and the path loss between the first terminal and the second terminal.

S505. The first terminal transmits a signal to the second terminal based on the determined transmission power.

According to the transmission power control method provided in this embodiment of this application, the second terminal sends the second signal to the first terminal, and the first terminal determines the path loss between the first terminal and the second terminal based on the second signal, receives the third power indication information sent by the second terminal or the network device, and determines the transmission power based on the path loss between the first terminal and the second terminal and the third power indication information, so that a more accurate power can be determined, and therefore signal transmission can be performed based on the determined transmission power, to avoid, to some extent, using a power higher than an actually required transmission power to perform signal transmission.

It should be noted that, for the embodiments shown in FIG. 4, FIG. 5, and FIG. 6, the step that the network device or the second terminal sends the third power indication information to the first terminal may be replaced with a step that the network device or the second terminal sends channel information to the first terminal. In this case, that the first terminal determines the transmission power based on the channel information is specifically determining a first power value based on channel quality, and determining the transmission power based on the first power value, the path loss, and the like.

When the network device sends the channel information, the second terminal may first send the channel information to the network device, and the network device receives the channel information sent by the second terminal, and further sends the channel information to the first terminal.

FIG. 7 is a further implementation flowchart of transmission power control according to an embodiment of this application.

In a procedure of the method shown in FIG. 7 in this embodiment of this application, execution steps of S601, S602, S603, and S604 are optional steps. In addition, an implementation in which the first terminal or the second terminal determines the path loss in the foregoing embodiments may be used. In this embodiment of this application, an implementation process in which the second terminal determines a path loss is used as an example for description, the execution steps of S601 and S602 are similar to the execution steps of S101 and S102 in FIG. 2, and the execution steps of S603 and S604 are as follows.

S603. The second terminal sends path loss indication information to a network device.

In this embodiment of this application, after determining the path loss between the second terminal and the first terminal, the second terminal may send the path loss indication information to the network device, and the network device sends the path loss indication information to the first terminal.

S604. The network device sends the path loss indication information to the first terminal.

It may be understood that, in this embodiment of this application, if the first terminal receives a signal on a sidelink, the second terminal may directly send the path loss indication information to the first terminal. If the second terminal directly sends the path loss indication information to the first terminal, steps S603 and S604 are optional steps.

S605. The second terminal sends channel information to the network device, where the channel information is used to indicate quality information of a channel for communication between the first terminal and the second terminal, and the network device receives the channel information sent by the second terminal, and determines first power indication information, second power indication information, or third power indication information.

In this embodiment of this application, the channel information sent by the second terminal to the network device is used by the network device to determine a first power value based on the quality information of the channel for communication between the first terminal and the second terminal, and further determine the first power indication information, the second power indication information, or the third power indication information.

It may be understood that, if the network device determines the first power value in another manner, step S605 is optional.

In this embodiment of this application, after receiving the channel information, the network device may determine the first power indication information, or may determine the second power indication information, or may determine the third power indication information. Specifically, one of the following execution steps of S606a. S606b, and S606c may be selected for execution.

S606a. The network device determines the first power indication information, and sends the first power indication information to the first terminal.

S606b. The network device determines the second power indication information, and sends the second power indication information to the second terminal: and the second terminal receives the second power indication information sent by the network device, determines first power indication information based on the second power indication information, and sends the first power indication information to the first terminal. Alternatively, the second terminal receives the second power indication information sent by the network device, determines third power indication information based on the second power indication information, and sends the third power indication information to the first terminal.

Optionally, if the first terminal does not receive a signal on a sidelink, the network device may send the second power indication information to the first terminal. If the second power indication information is determined by the second terminal, after determining the second power indication information, the second terminal sends the second power indication information to the network device, and the network device sends the second power indication information to the first terminal, so that the implementation is applicable to an application scenario in which the first terminal does not receive a signal on a sidelink.

S606c. The network device determines the third power indication information, and sends the third power indication information to the first terminal.

S607. The first terminal determines a transmission power.

Specifically, if the foregoing step S606a is performed, the first terminal receives the path loss indication information and the first power indication information that are sent by the network device, and determines the transmission power of the first terminal based on the path loss between the second terminal and the first terminal and the first power indication information.

If the foregoing step S606a is performed, the first terminal receives the path loss indication information and the second power indication information that are sent by the network device, and determines the transmission power of the first terminal based on the path loss between the second terminal and the first terminal and the second power indication information.

If the foregoing step S606c is performed, the first terminal receives the path loss indication information and the third power indication information that are sent by the network device, and determines the transmission power of the first terminal based on the path loss between the second terminal and the first terminal and the third power indication information.

S608. The first terminal transmits a signal to the second terminal based on the determined transmission power.

According to the transmission power control method provided in this embodiment of this application, the second terminal determines the path loss between the second terminal and the first terminal, and sends the path loss indication information to the network device, and the network device sends the path loss indication information to the first terminal. In addition, the second terminal sends the channel information to the network device, the network device determines the second power indication information based on the channel information, and sends the second power indication information to the first terminal, and the first terminal determines the transmission power based on the path loss that is between the second terminal and the first terminal and that is indicated in the path loss indication information and the second power indication information, so that a more accurate power can be determined, and therefore signal transmission can be performed based on the determined transmission power, to avoid, to some extent, using a power higher than an actually required transmission power to perform signal transmission. In addition, the method is applicable to an application scenario in which the first terminal does not receive a signal on a sidelink.

It should be noted that, in this specification, claims, and accompanying drawings of the embodiments of this application, the terms "first", "second", and the like are used to distinguish between similar objects but do not necessarily indicate a specific order or sequence. For example, the first power indication information and the second power indication information in the embodiments of this application are merely used for ease of description and distinguishing different power indication information, but do not constitute a limitation to power indication information. It should be understood that the objects termed in such a way are interchangeable in proper circumstances, so that the embodiments of this application described herein can be implemented in other orders than the order illustrated or described herein.

It should be further noted that, the steps performed in the methods in the embodiments of this application and execution steps used an example for description in the accompanying drawings are not construed as any limitation to a specific execution order, and it is not necessary to include all steps shown in the accompanying drawings.

The foregoing mainly describes the solutions provided in the embodiments of this application from the perspective of interaction between the first terminal, the second terminal, and the network device. It may be understood that, to implement the foregoing functions, the first terminal, the second terminal, and the network device include a corresponding hardware structure and/or software module for performing each function. With reference to the examples described in the embodiments disclosed in this application, units (devices, components) and algorithm steps can be implemented by hardware or a combination of hardware and computer software in the embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the technical solutions of the embodiments of this application.

In the embodiments of this application, functional units (devices, components) of the terminal and the network device may be divided based on the foregoing method examples. For example, each functional unit (device, component) may be divided according to each function, or two or more functions may be integrated into one processing unit (device, component). The integrated unit (device, component) may be implemented in a form of hardware, or may be implemented in a form of a software functional unit (device, component). It should be noted that, the unit (device, component) division in the embodiments of this application is an example, and is merely logical function division. There may be another division manner in an actual implementation.

Figure 8:
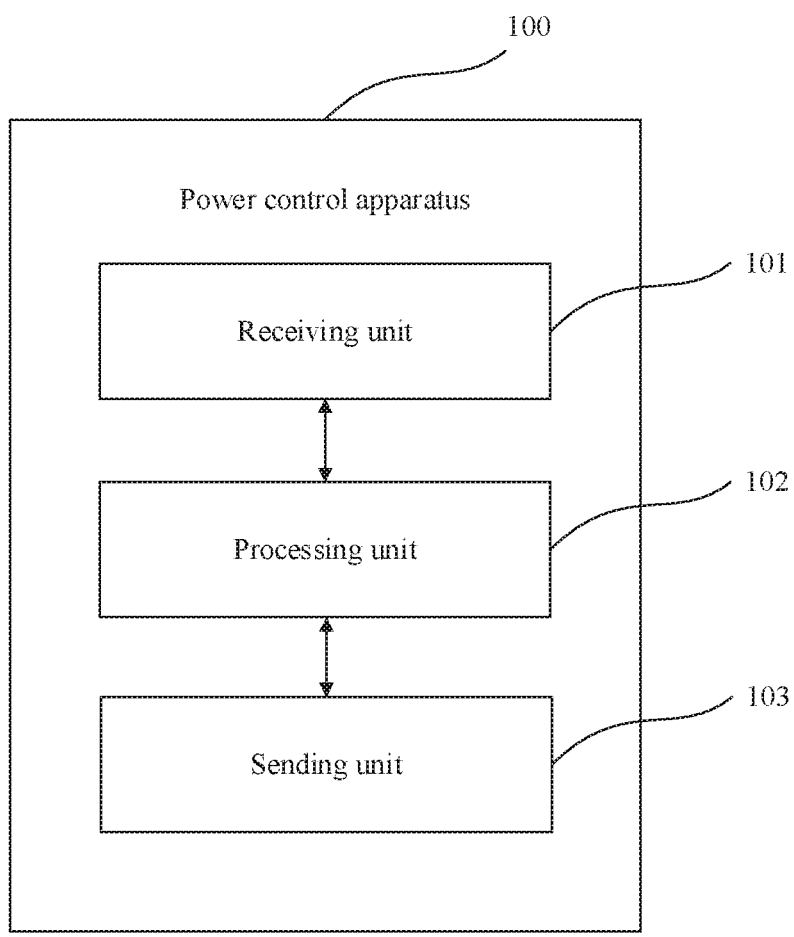
FIG. 8 is a schematic structural diagram of a power control apparatus according to an embodiment of this application.

In a case in which the integrated unit (device, component) is used, FIG. 8 is a schematic structural diagram of a power control apparatus according to an embodiment of this application. The power control apparatus 100 shown in FIG. 8 may be applied to a first terminal. Referring to FIG. 8, the power control apparatus 100 applied to the first terminal includes a receiving unit 101, a processing unit 102, and a sending unit 103.

In a possible implementation, the receiving unit 101 is configured to receive first power indication information sent by a second terminal or a network device. The processing unit 102 is configured to determine a transmission power of the first terminal based on the first power indication information received by the receiving unit 101. The sending unit 103 is configured to transmit a signal to the second terminal based on the transmission power determined by the processing unit 102.

The first power indication information is determined by the second terminal or the network device based on a path loss between the second terminal and the first terminal, and the processing unit 102 determines the transmission power based on the first power indication information, so that a more accurate power can be determined, and therefore signal transmission can be performed based on the determined transmission power, to avoid, to some extent, that the first terminal uses a power higher than an actually required transmission power to perform signal transmission.

That the first power indication information is determined by the second terminal or the network device based on the path loss between the second terminal and the first terminal specifically means that the first power indication information is determined by the second terminal or the network device based on a first power value and the path loss between the second terminal and the first terminal.

The first power value is determined by the second terminal based on quality information, obtained by the second terminal through measurement, of a channel for communication between the second terminal and the first terminal: or the first power value is determined by the second terminal or the network device based on second power indication information sent by the network device to the second terminal. Specifically, the quality information of the channel includes at least one of the following: a receive interference level, signal received quality, and received signal strength.

In a possible example, the sending unit 103 is further configured to: before the receiving unit 101 receives the first power indication information sent by the second terminal or the network device, send a first signal to the second terminal, where the first signal is used by the second terminal to determine a path loss between the first terminal and the second terminal based on a transmit power of the first signal.

In another possible implementation, the receiving unit 101 is configured to receive third power indication information sent by the second terminal or the network device. The processing unit 102 is configured to determine a transmission power of the first terminal based on the third power indication information received by the receiving unit 101 and the path loss between the first terminal and the second terminal. The sending unit 103 is configured to transmit a signal to the second terminal based on the transmission power determined by the processing unit 102.

In a possible example, the receiving unit 101 is further configured to: before the processing unit 102 determines the transmission power of the first terminal based on the second power indication information and the path loss between the first terminal and the second terminal, receive path loss indication information sent by the network device or the second terminal, where the path loss indication information is used to indicate the path loss between the second terminal and the first terminal.

In another possible example, the sending unit 103 is further configured to: before the processing unit determines the transmission power of the first terminal based on the second power indication information and the path loss between the first terminal and the second terminal, send a first signal to the second terminal. The receiving unit 101 is further configured to: before the processing unit determines the transmission power of the first terminal based on the second power indication information and the path loss between the first terminal and the second terminal, and after the sending unit 103 sends the first signal, receive first-signal receive power indication information sent by the second terminal, where the first-signal receive power indication information is used to indicate a receive power at which the second terminal receives the first signal. The processing unit 102 is further configured to determine the path loss between the first terminal and the second terminal based on the first-signal receive power indication information.

In another possible example, the receiving unit 101 is further configured to: before the processing unit 102 determines the transmission power of the first terminal based on the second power indication information and the path loss between the first terminal and the second terminal, receive a second signal sent by the second terminal. The processing unit 102 is further configured to determine the path loss between the first terminal and the second terminal based on a transmit power of the second signal.

The third power indication information is determined by the second terminal based on the quality information, obtained by the second terminal through measurement, of the channel for communication between the second terminal and the first terminal, or may be determined by the second terminal based on the second power indication information sent by the network device to the second terminal. Specifically, the quality information of the channel includes at least one of the following: a receive interference level, signal received quality, and received signal strength.

When units (devices, components) and algorithm steps are implemented by hardware, in this embodiment of this application, the processing unit 102 may be a processor or a controller. The sending unit 103 and the receiving unit 101 may be a communications interface, a transceiver, a transceiver circuit, or the like. The communications interface is a collective name, and may include one or more interfaces.

Figure 9:
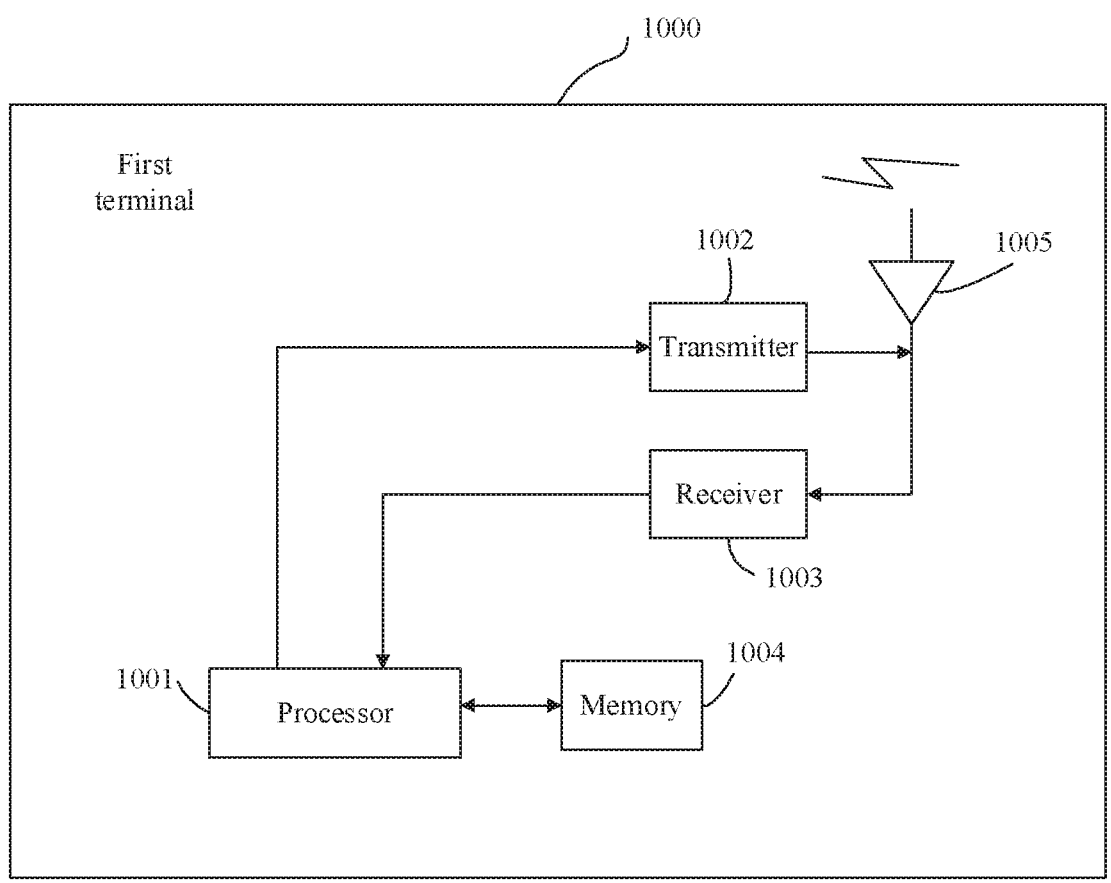
FIG. 9 is a schematic structural diagram of another power control apparatus according to an embodiment of this application.

When the processing unit 102 is a processor, the sending unit 103 is a transmitter, and the receiving unit 101 is a receiver, the communications apparatus 100 in this embodiment of this application may be a power control apparatus shown in FIG. 9. The power control apparatus shown in FIG. 9 may be a terminal, and the terminal may be the first terminal in the foregoing method embodiments.

FIG. 9 is a schematic structural diagram of a first terminal 1000 according to an embodiment of this application. In other words, FIG. 9 is another schematic structural diagram of the power control apparatus 100. Referring to FIG. 9, the first terminal 1000 includes a processor 1001, a transmitter 1002, and a receiver 1003, where the processor 1001 may alternatively be a controller. The processor 1001 is configured to support the first terminal 1000 in performing functions of the first terminal in FIG. 2 to FIG. 7. The transmitter 1002 and the receiver 1003 are configured to support the first terminal 1000 in performing message receiving and sending functions with a second terminal and a network device. The terminal 1000 may further include a memory 1004, and the memory 1004 is configured to couple with the processor 1001, and stores a program instruction and data that are necessary for the first terminal 1000. The processor 1001 is separately connected to the transmitter 1002, the receiver 1003, and the memory 1004. The memory 1004 is configured to store an instruction. The processor 1001 is configured to execute the instruction stored in the memory 1004, to control the transmitter 1002 and the receiver 1003 to receive and send data, to complete the steps that the first terminal performs corresponding functions in the foregoing methods.

Further, the first terminal 1000 may further include an antenna 1005.

In the embodiments of this application, for a concept, an explanation, details, and other steps related to the technical solutions for the power control apparatus 100 and the first terminal 1000 that are provided in the embodiments of this application, reference may be made to the foregoing method or description about the content in another embodiment. Details are not described herein again.

Figure 10:
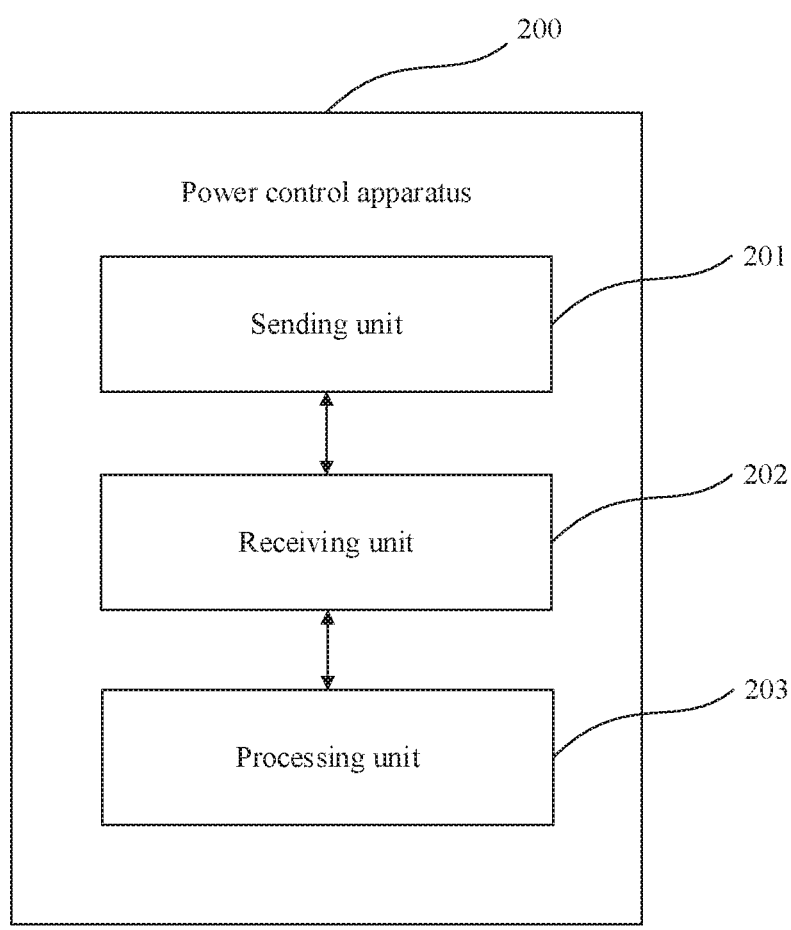
FIG. 10 is a schematic structural diagram of still another power control apparatus according to an embodiment of this application.

In a case in which the integrated unit (device, component) is used, FIG. 10 is a schematic structural diagram of a power control apparatus according to an embodiment of this application. The power control apparatus 200 shown in FIG. 10 may be applied to a second terminal. Referring to FIG. 10, the power control apparatus 200 applied to the second terminal includes a sending unit 201, a receiving unit 202, and a processing unit 203.

The sending unit 201 is configured to send channel information to a network device, and further send first power indication information to a first terminal. The channel information is used to indicate quality information of a channel for communication between the second terminal and the first terminal.

The receiving unit 202 is configured to receive second power indication information sent by the network device. The second power indication information is determined by the network device based on the quality information that is of the channel and that is indicated in the channel information sent by the sending unit 201.

In a possible implementation, the processing unit 203 is configured to determine the first power indication information based on the second power indication information received by the receiving unit 202, and the sending unit 201 is further configured to send the first power indication information to the first terminal, where the first power indication information is used by the first terminal to determine a transmission power of the first terminal, and the transmission power is a transmission power used when the first terminal communicates with the second terminal.

In another possible implementation, the processing unit 203 is configured to determine third power indication information based on the second power indication information received by the receiving unit 202, and the sending unit 201 is further configured to send the third power indication information to the first terminal, where the third power indication information is used by the first terminal to determine a transmission power of the first terminal, and the transmission power is a transmission power used when the first terminal communicates with the second terminal.

The quality information of the channel includes at least one of the following: a receive interference level, signal received quality, and received signal strength.

In a possible example, the processing unit 203 may determine the first power indication information based on a first power value indicated in the second power indication information, or may determine the first power indication information based on the second power indication information and a path loss between the second terminal and the first terminal.

In a possible example, the processing unit 203 may determine the third power indication information based on the first power value indicated in the second power indication information, or may determine the third power indication information based on the second power indication information and a path loss between the second terminal and the first terminal.

In another possible example, the sending unit 201 is further configured to send path loss indication information to the first terminal, where the path loss indication information is used to indicate the path loss between the second terminal and the first terminal.

The receiving unit 202 is further configured to receive a first signal sent by the first terminal, and the processing unit 203 is further configured to determine the path loss between the second terminal and the first terminal based on a transmit power of the first signal.

In another possible example, the receiving unit 202 may be configured to receive the first signal sent by the first terminal. The sending unit 201 is configured to send first-signal receive power indication information to the first terminal, where the first-signal receive power indication information is used to indicate a receive power at which the second terminal receives the first signal, the first-signal receive power indication information is used by the first terminal to determine a path loss between the first terminal and the second terminal, and the path loss is used by the first terminal to determine the transmission power of the first terminal.

In another possible example, the sending unit 201 may be further configured to send a second signal to the first terminal, where the second signal is used by the first terminal to determine the path loss between the first terminal and the second terminal based on a transmit power of the second signal.

When implemented by using hardware, in this embodiment of this application, the processing unit 203 may be a processor or a controller. The sending unit 201 may be a transmitter, a communications interface, a transceiver circuit, or the like. The receiving unit 202 may be a communications interface, a transceiver, a transceiver circuit, or the like. The communications interface is a collective name, and may include one or more interfaces.

Figure 11:
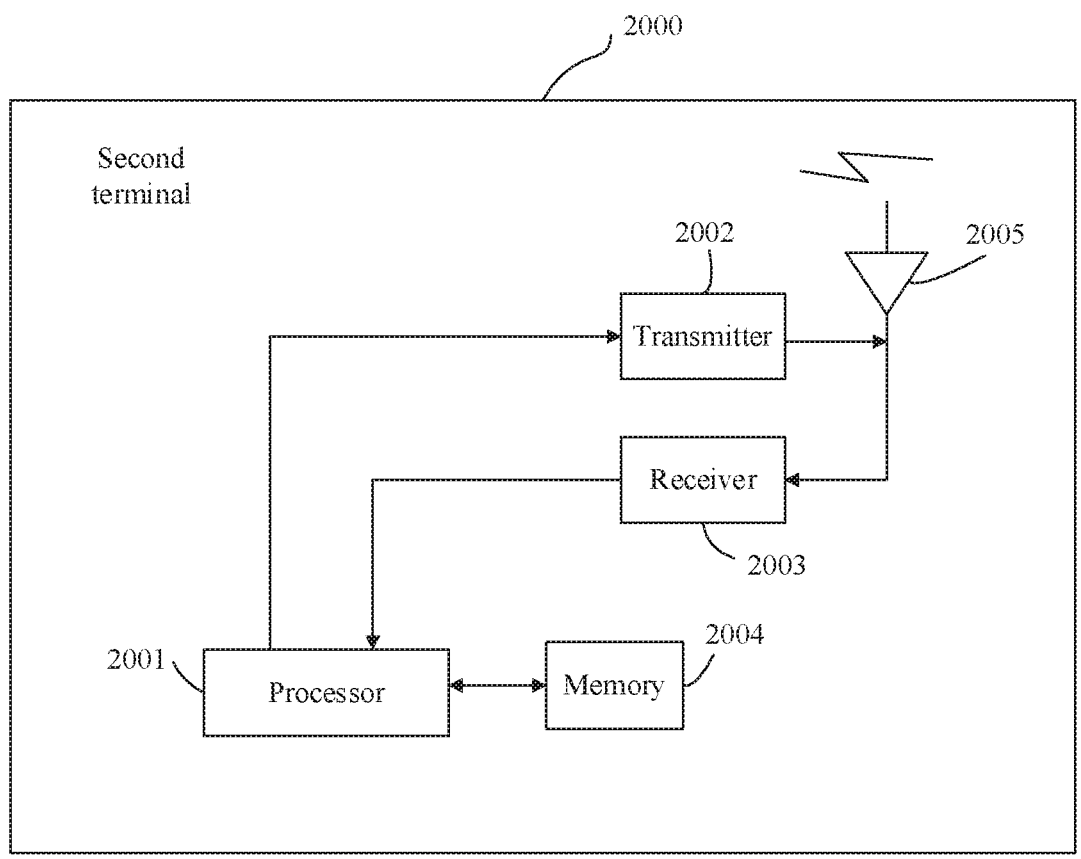
FIG. 11 is a schematic structural diagram of a first terminal according to an embodiment of this application.

When the processing unit 203 is a processor, the sending unit 201 is a transmitter, and the receiving unit 202 is a receiver, the communications apparatus 200 in this embodiment of this application may be a power control apparatus shown in FIG. 11. The power control apparatus shown in FIG. 11 may be a terminal, and the terminal may be the second terminal in the foregoing method embodiments.

FIG. 11 is a schematic structural diagram of a second terminal 2000 according to an embodiment of this application. In other words, FIG. 11 is another schematic structural diagram of the power control apparatus 200. Referring to FIG. 11, the second terminal 2000 includes a processor 2001, a transmitter 2002, and a receiver 2003. The processor 2001 may alternatively be a controller. The processor 2001 is configured to support the second terminal 2000 in performing functions of the second terminal in FIG. 2 to FIG. 7. The transmitter 2002 and the receiver 2003 are configured to support the second terminal 2000 in performing message receiving and sending functions with a first terminal and a network device. The second terminal 2000 may further include a memory 2004, and the memory 2004 is configured to couple with the processor 2001, and stores a program instruction and data that are necessary for the second terminal 2000. The processor 2001 is separately connected to the transmitter 2002, the receiver 2003, and the memory 2004, the memory 2004 is configured to store an instruction.

The processor 2001 is configured to execute the instruction stored in the memory 2004, to control the transmitter 2002 and the receiver 2003 to receive and send data, to complete the steps that the second terminal performs corresponding functions in the foregoing methods.

Further, the second terminal 2000 may further include an antenna 2005.

In the embodiments of this application, for a concept, an explanation, details, and other steps related to the technical solutions for the power control apparatus 200 and the second terminal 2000 that are provided in the embodiments of this application, reference may be made to the foregoing method or description about the content in another embodiment. Details are not described herein again.

Figure 12:
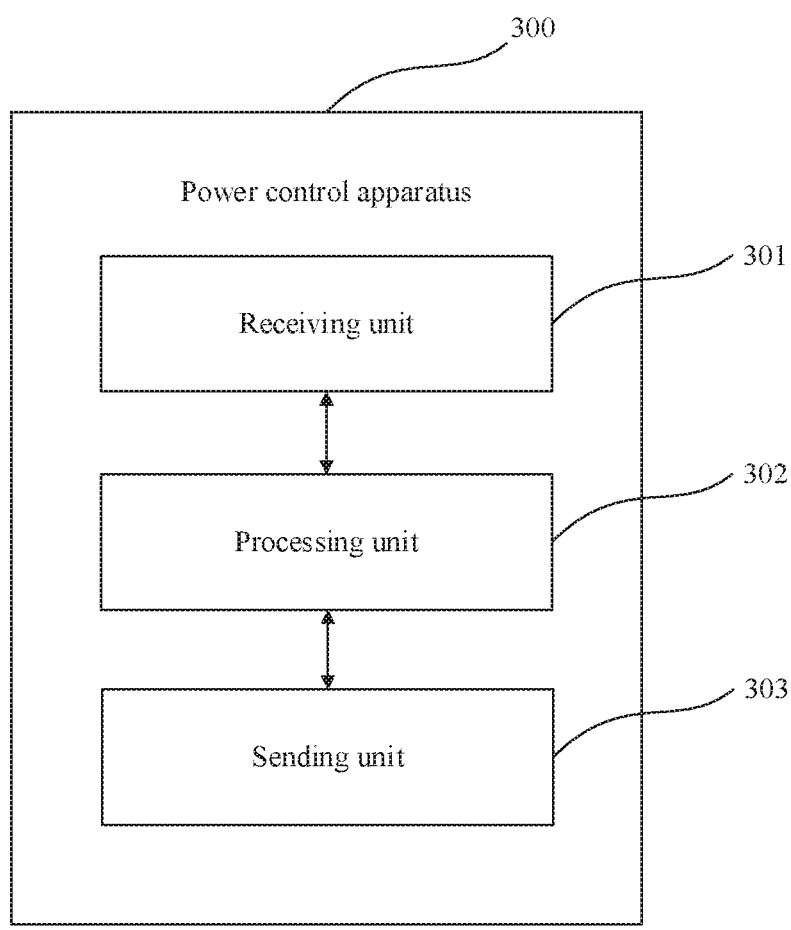
FIG. 12 is a schematic structural diagram of a second terminal according to an embodiment of this application.

In a case in which the integrated unit (device, component) is used, FIG. 12 is a schematic structural diagram of a power control apparatus according to an embodiment of this application. The power control apparatus 300 shown in FIG. 12 may be applied to a network device. Referring to FIG. 12, the power control apparatus 300 applied to the network device includes a receiving unit 301, a processing unit 302, and a sending unit 303. The receiving unit 301 is configured to receive channel information sent by a second terminal, and the channel information is used to indicate quality information of a channel for communication between a first terminal and the second terminal.

In a possible implementation, the processing unit 302 is configured to determine second power indication information based on the quality information that is of the channel and that is indicated in the channel information received by the receiving unit 301. The sending unit 303 is configured to send the second power indication information determined by the processing unit 302 to the second terminal. The second power indication information is used by the second terminal to determine first power indication information based on the second power indication information, and the first power indication information is used by the first terminal to determine a transmission power of the first terminal. Alternatively, the second power indication information is used by the second terminal to determine third power indication information based on the second power indication information, and the third power indication information is used by the first terminal to determine a transmission power of the first terminal.

In a possible implementation, the processing unit 302 is configured to determine the third power indication information based on the quality information that is of the channel and that is indicated in the channel information received by the receiving unit 301. The sending unit 303 is configured to send the third power indication information determined by the processing unit 302 to the second terminal. The third power indication information is used by the first terminal to determine the transmission power of the first terminal.

In another possible implementation, the processing unit 302 is configured to determine first power indication information based on the quality information that is of the channel and that is indicated in the channel information received by the receiving unit 301. The sending unit 303 is configured to send the first power indication information determined by the processing unit 302 to the second terminal. The first power indication information is used by the first terminal to determine the transmission power of the first terminal.

The transmission power of the first terminal is a transmission power used when the first terminal communicates with the second terminal. The quality information of the channel includes at least one of the following: a receive interference level, signal received quality, and received signal strength.

The second power indication information is used to indicate a first power value.

In a possible example, the receiving unit 301 is further configured to receive path loss indication information sent by the second terminal, where the path loss indication information is used to indicate a path loss between the second terminal and the first terminal.

In another possible example, the sending unit 303 is further configured to send the path loss indication information to the first terminal, and the path loss indication information is used to indicate a path loss between the second terminal and the first terminal.

When implemented by using hardware, in this embodiment of this application, the processing unit 302 may be a processor or a controller. The sending unit 303 and the receiving unit 301 may be a communications interface, a transceiver, a transceiver circuit, or the like. The communications interface is a collective name, and may include one or more interfaces.

Figure 13:
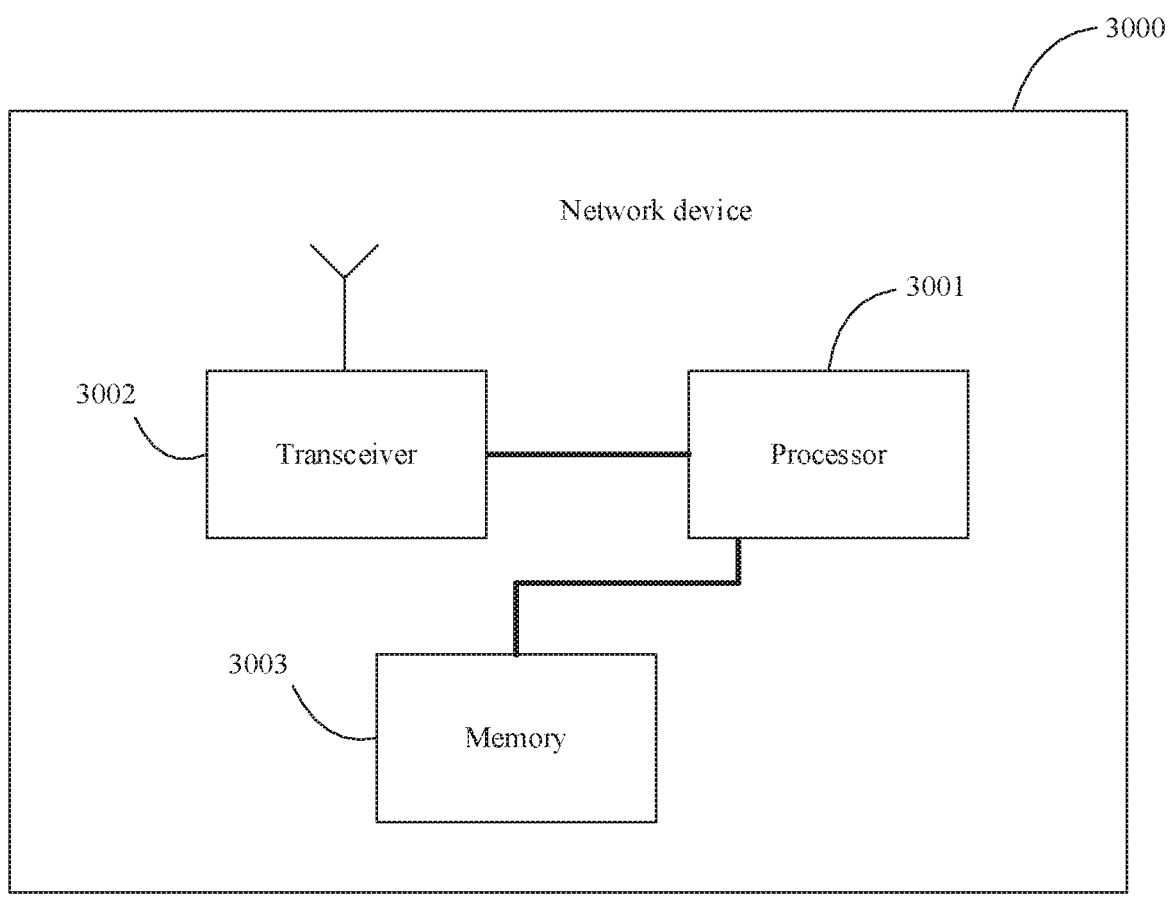
FIG. 13 is a schematic structural diagram of a network device according to an embodiment of this application.

When the processing unit 302 is a processor, the sending unit 303 and the receiving unit 301 are a transceiver, the power control apparatus 300 in this embodiment of this application may be a power control apparatus shown in FIG. 13. The power control apparatus shown in FIG. 13 may be a network device, for example, a base station.

FIG. 13 is a schematic structural diagram of a network device 3000 according to an embodiment of this application. In other words, FIG. 13 is another schematic structural diagram of the power control apparatus 300. Referring to FIG. 13, the network device 3000 includes a processor 3001 and a transceiver 3002. The processor 3001 may alternatively be a controller. The processor 3001 is configured to support the network device in performing functions in FIG. 2 to FIG. 7. The transceiver 3002 is configured to support the network device in performing message receiving and sending functions. The network device may further include a memory 3003, and the memory 3003 is configured to be couple with the processor 3001, and stores a program instruction and data that are necessary for the network device. The processor 3001 is separately connected to the transceiver 3002 and the memory 3003. The memory 3003 is configured to store an instruction, and the processor 3001 is configured to execute the instruction stored in the memory 3003, to control the transceiver 3002 to receive and send a signal, to complete the steps that the network device performs corresponding functions in the foregoing methods.

In the embodiments of this application, for a concept, an explanation, details, and other steps related to the technical solutions for the power control apparatus 300 and the network device 3000 that are provided in the embodiments of this application, reference may be made to the foregoing method or description about the content in another embodiment. Details are not described herein again.

It may be understood that, only a simplified design of each of the first terminal, the second terminal, and the network device is shown in the accompanying drawings of the embodiments of this application. During actual application, the terminal and the network device are not limited to the foregoing structure, for example, may further include an antenna array, a duplexer, and a baseband processing part.

The duplexer of the network device is configured to implement the antenna array, is configured to send a signal, and is also configured to receive a signal. The transmitter is configured to implement conversion between a radio frequency signal and a baseband signal. Usually, the transmitter may include a power amplifier, a digital-to-analog converter, and a frequency converter. Usually, the receiver may include a low noise amplifier, an analog-to-digital converter, and a frequency converter. The receiver and the transmitter may sometimes also be referred to as a transceiver. The baseband processing part is configured to implement processing of sending or receiving a signal, for example, layer mapping, precoding, modulation/demodulation, encoding/decoding, and the like, and perform separate processing on a physical control channel, a physical data channel, a physical broadcast channel, a reference signal, and the like. For another example, the terminal may further include a display device, an input/output interface, and the like.

The first terminal and the second terminal may include a single antenna, or may include multiple antennas (namely an antenna array). The duplexer of the terminal is configured to implement the antenna array, is configured to send a signal, and is also configured to receive a signal. The transmitter is configured to implement conversion between a radio frequency signal and a baseband signal. Usually, the transmitter may include a power amplifier, a digital-to-analog converter, and a frequency converter. Usually, the receiver may include a low noise amplifier, an analog-to-digital converter, and a frequency converter. The baseband processing part is configured to implement processing of sending or receiving a signal, for example, layer mapping, precoding, modulation/demodulation, encoding/decoding, and the like, and perform separate processing on a physical control channel, a physical data channel, a physical broadcast channel, a reference signal, and the like. In an example, the terminal may also include a control part, configured to request an uplink physical resource, calculate channel state information (channel state information, CSI) corresponding to a downlink channel, and determine whether a downlink data packet is successfully received, and so on.

It should be noted that, the processor in the embodiments of this application may be a central processing unit (central processing unit, CPU), a general purpose processor, a digital signal processor (digital signal processor. DSP), an application-specific integrated circuit (application-specific integrated circuit. ASIC), a field programmable gate array (field programmable gate array, FPGA) or another programmable logic device, a transistor logic device, a hardware component, or any combination thereof. The processor may implement or execute various exemplary logical blocks, modules, and circuits that are described with reference to the content disclosed in this application. Alternatively, the processor may be a combination implementing a computing function, for example, a combination of one or more microprocessors, or a combination of the DSP and a microprocessor.

The memory may be integrated in the processor, or may be separate from the processor.

In an implementation, functions of the receiver and the transmitter may be implemented by using a transceiver circuit or a dedicated transceiver chip. The processor may be implemented by using a dedicated processing chip, a processing circuit, a processor, or a general purpose chip.

In another implementation, program code for implementing functions of the processor, the receiver, and the transmitter is stored in the memory, and the general purpose processor implements the functions of the processor, the receiver, and transmitter by executing the code in the memory.

According to the methods provided in the embodiments of this application, an embodiment of this application further provides a communications system, and the communications system includes the foregoing network device, one or more first terminals, and one or more second terminals.

An embodiment of this application further provides a chip, where the chip is connected to a memory, and is configured to read and execute a software program stored in the memory, to implement functions performed by the first terminal in the foregoing embodiments.

An embodiment of this application further provides a chip, where the chip is connected to a memory, and is configured to read and execute a software program stored in the memory, to implement functions performed by the second terminal in the foregoing embodiments.

An embodiment of this application further provides a chip, where the chip is connected to a memory, and is configured to read and execute a software program stored in the memory, to implement functions performed by the network device in the foregoing embodiments.

An embodiment of this application further provides a computer storage medium, where the computer storage medium stores some instructions, and when these instructions are executed, the communication method in the foregoing method embodiments can be completed.

An embodiment of this application further provides a computer program product, where the computer program product includes a computer program, and the computer program is used to perform the communication method in the foregoing method embodiments.

According to the power control method and apparatus, the terminal, and the network device provided in this application, when any one of two terminals that perform direct communication determines a transmission power of the terminal, the terminal determines the transmission power based on at least one of a path loss between the two terminals that perform direct communication and a channel quality status of another terminal used as a receive end in the two terminals that perform direct communication, so that a more accurate power can be determined, and therefore signal transmission can be performed based on the determined transmission power, to avoid, to some extent, using a power higher than an actually required transmission power to perform signal transmission.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a magnetic disk storage, a CD-ROM, an optical memory, and the like) that include computer usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

What is claimed is:

1. A power control method implemented by a first terminal device, comprising:
sending a first signal to a second terminal device;
receiving first-signal receive power indication information from the second terminal device, wherein the first-signal receive power indication information at least indicates a receive power at which the second terminal device receives the first signal wherein the first signal is a reference signal transmitted on a physical sidelink shared channel (PSSCH);
determining, by the first terminal device, a path loss between the first terminal device and the second terminal device based on the first-signal receive power indication information;
receiving, by the first terminal device, third power indication information from a base station, wherein the third power indication information indicated a first power value, and wherein the first power value is configured for a resource pool or different resource pools,
determining, by the first terminal device, a transmission power of the first terminal device based on the third power indication information and the path loss between the first terminal device and the second terminal device;
transmitting a signal to the second terminal device using the transmission power; and
performing, by the first terminal device, device-to-device (D2D) communication via a communication channel between the first terminal device and the second terminal device.

2. The power control method of claim 1, wherein the first-signal receive power indication information further indicates at least one of a receive interference level, a signal received quality, or a received signal strength.

3. The power control method of claim 1, wherein before receiving the first-signal receive power indication information, the power control method further comprises the first terminal device sending the first signal to the second terminal device a plurality of times, and wherein the first signal enables the second terminal device to determine the path loss by performing filtering on a plurality of first-signal receive powers at which the first signal is received, and wherein the first-signal receive power indication information further indicates the path loss determined by the second terminal device.

4. The power control method of claim 1, wherein the first power value independent of the path loss between the first terminal device and the second terminal device.

5. The power control method of claim 1, wherein the first terminal device determines the transmission power without regard to path losses between the base station and the first and second terminal devices.

6. A power control method implemented by a second terminal device, comprising:
receiving a first signal from a first terminal device; and
sending first-signal receive power indication information to the first terminal device, wherein the first-signal receive power indication information indicates a receive power at which the second terminal device receives the first signal, wherein the first signal is a reference signal transmitted on a physical sidelink shared channel (PSSCH), wherein the first-signal receive power indication information enables the first terminal device to determine a path loss between the first terminal device and the terminal second device, wherein the path loss enables the first terminal device to determine a transmission power based on the path loss and third power indication information, wherein the third power indication information is transmitted from a base station to the first terminal device, wherein the third power indication information indicates a first power value, wherein the first power value is configured for a resource pool or different resource pools,
wherein the transmission power enables the first terminal device to communicate with the second terminal device, and wherein the first terminal device is configured to perform device-to-device (D2D) communication via a communication channel between the first terminal device and the second terminal device.

7. The power control method of claim 6, wherein the first power value is independent of the path loss between the first terminal device and the second terminal device.

8. The power control method of claim 6, further comprising sending path loss indication information to the first terminal device, wherein the path loss indication information indicates a difference between the receive power at which the second terminal device receives the first signal and a transmit power at which the first terminal device transmits the first signal to the second terminal device.

9. The power control method of claim 8, further comprising:
receiving the first signal from the first terminal device a plurality of times; and
performing filtering on a plurality of first-signal receive powers at which the first signal is received the plurality of times.

10. The power control method of claim 6 further comprising:
determining the first-signal receive power indication information based on second power indication information and the path loss between the second terminal device and the first terminal device; and
determining the third power indication information based on the second power indication information and the path loss.

11. The power control method of claim 6, further comprising:
receiving the first signal from the first terminal device a plurality of times;

performing filtering on a plurality of first-signal receive powers at which the first signal is received the plurality of times; and sending the first-signal receive power indication information to the first terminal device, wherein the first-signal receive power indication information further indicates a filtered receive power at which the second terminal device receives the first signal, and wherein the first-signal receive power indication information enables the first terminal device to determine the transmission power based on the path loss and the filtered receive power.

12. The power control method of claim 6, further comprising sending a second signal to the first terminal device, wherein the second signal enables the first terminal device to determine the path loss between the first terminal device and the second terminal device based on a transmit power at which the second terminal device transmits the second signal to the first terminal device.

13. The power control method of claim 6, further comprising sending channel information to the base station, herein the channel information indicates quality information of the communication channel between the second terminal device and the first terminal device with which the second terminal device performs the D2D communication, and wherein the quality information comprises at least one of a receive interference level, a signal received quality, or a received signal strength.

14. The power control method of claim 6, further comprising the base station determining the first power value based on a resource usage status of receiving resources by the second terminal device.

15. An apparatus, comprising:
at least one processor; and
a memory coupled to the at least one processor and configured to store programming instructions that, when executed by the at least one processor, cause the apparatus to:
  send a first signal to a second terminal device;
  receive first-signal receive power indication information from the second terminal device, wherein the first-signal receive power indication information at least indicates a receive power at which the second terminal receives the first signal, and wherein the first signal is a reference signal transmitted on a physical sidelink shared channel (PSSCH);
  determine a path loss between a first terminal device and the second terminal device based on the first-signal receive power indication information;
  receive third power indication information from a base station, wherein the third power indication information indicates a first power value, and wherein the first power value is configured for a resource pool or different resource pools;
  determine a transmission power of the first terminal device based on the third power indication information and the path loss between the first terminal device and the second terminal device; and
  transmit a second signal to the second terminal device using the transmission power,
wherein the first terminal device is configured to perform device-to-device (D2D) communication via a communication channel between the first terminal device and the second terminal device.

16. An apparatus, comprising:
at least one processor; and
a memory coupled to the at least one processor and configured to store programming instructions that, when executed by the at least one processor, cause the apparatus to:
  receive a first signal from a first terminal device; and
  send first-signal receive power indication information to the first terminal device, wherein the first-signal receive power indication information indicates a receive power at which a second terminal device receives the first signal, wherein the first signal is a reference signal transmitted on a physical sidelink shared channel (PSSCH), wherein the first-signal receive power indication information enables the first terminal device to determine a path loss between the first terminal device and the second terminal device, wherein the path loss enables the first terminal device to determine a transmission power based on the path loss and third power indication information, wherein the third power indication information is transmitted from a base station to the first terminal device, wherein the third power indication information indicates a first power value, wherein the first power value is configured for a resource pool or different resource pools, wherein the transmission power enables the first terminal device to communicate with the second terminal device, and wherein the first terminal device is configured to perform device-to-device (D2D) communication via a communication channel between the first terminal device and the second terminal device.

* * * * *

UNITED STATES PATENT AND TRADEMARK OFFICE
CERTIFICATE OF CORRECTION

PATENT NO. : 11,191,036 B2  
APPLICATION NO. : 16/638312  
DATED : November 30, 2021  
INVENTOR(S) : Cai et al.

Page 1 of 1

It is certified that error appears in the above-identified patent and that said Letters Patent is hereby corrected as shown below:

In the Claims

Claim 1, Column 35, Line 33: "signal wherein" should read "signal, wherein"

Claim 1, Column 35, Line 42: "information indicated a" should read "information indicates a"

Claim 1, Column 35, Line 42: "pools," should read "pools;"

Claim 13, Column 37, Line 22: "herein the" should read "wherein the"

Signed and Sealed this  
Eleventh Day of January, 2022

Drew Hirshfeld  
*Performing the Functions and Duties of the*  
*Under Secretary of Commerce for Intellectual Property and*  
*Director of the United States Patent and Trademark Office*